US012201568B2

(12) United States Patent
Childs et al.

(10) Patent No.: US 12,201,568 B2
(45) Date of Patent: Jan. 21, 2025

(54) PATIENT SUPPORT SYSTEMS AND METHODS FOR ASSISTING CAREGIVERS WITH PATIENT CARE

(71) Applicant: Stryker Corporation, Kalamazoo, MI (US)

(72) Inventors: William D. Childs, Plainwell, MI (US); Connor F. St. John, Kalamazoo, MI (US); Brian J. Tessmer, Mattawan, MI (US); Krishna S. Bhimavarapu, Kalamazoo, MI (US); James K. Galer, Byron Center, MI (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/378,187

(22) Filed: Oct. 10, 2023

(65) Prior Publication Data

US 2024/0033150 A1 Feb. 1, 2024

Related U.S. Application Data

(63) Continuation of application No. 17/952,683, filed on Sep. 26, 2022, now Pat. No. 11,801,179, which is a
(Continued)

(51) Int. Cl.
*A61G 7/00* (2006.01)
*A61G 7/012* (2006.01)
(Continued)

(52) U.S. Cl.
CPC ............. *A61G 7/018* (2013.01); *A61G 7/001* (2013.01); *A61G 7/012* (2013.01); *A61G 7/015* (2013.01);
(Continued)

(58) Field of Classification Search
CPC .......... A61G 7/00; A61G 7/018; A61G 7/001; A61G 7/012; A61G 7/015; A61G 7/0524;
(Continued)

(56) References Cited

U.S. PATENT DOCUMENTS 3,886,610 A 6/1975 Shelden
5,611,096 A * 3/1997 Bartlett .................. A61G 7/001 5/713
(Continued)

FOREIGN PATENT DOCUMENTS

EP 1789278 A2 5/2007
EP 1820424 A2 8/2007
(Continued)

OTHER PUBLICATIONS

Agiliti Health, Inc., "Hercules Patient Repositioner Webpage", https://www.agilitihealth.com, 2023, 12 pages.
(Continued)

*Primary Examiner* — Fredrick C Conley
(74) *Attorney, Agent, or Firm* — Howard & Howard Attorneys PLLC

(57) ABSTRACT

A patient support system comprises a patient support apparatus for patients. The patient support apparatus comprises a base and a patient support surface supported by the base. The patient support apparatus also comprises powered devices that perform one or more predetermined functions on the patient support apparatus. Multiple input devices are employed to control the powered devices. The input devices are designed to enable caregivers to cause operation of the powered devices, as needed, while freeing the caregivers to perform other tasks.

19 Claims, 14 Drawing Sheets

Related U.S. Application Data continuation of application No. 17/125,142, filed on Dec. 17, 2020, now Pat. No. 11,484,452, which is a continuation of application No. 15/353,179, filed on Nov. 16, 2016, now Pat. No. 10,905,609.

(60) Provisional application No. 62/258,156, filed on Nov. 20, 2015.

(51) Int. Cl.

| | |
|---|---|
| ***A61G 7/015*** | (2006.01) |
| ***A61G 7/018*** | (2006.01) |
| ***A61G 7/05*** | (2006.01) |
| ***A61G 7/053*** | (2006.01) |

(52) U.S. Cl.
CPC ............ *A61G 7/0524* (2016.11); *A61G 7/053* (2013.01); *A61G 2203/10* (2013.01); *A61G 2203/34* (2013.01); *A61G 2203/42* (2013.01)

(58) Field of Classification Search
CPC ................ A61G 7/053; A61G 2203/10; A61G 2203/34; A61G 2203/42
See application file for complete search history.

(56) References Cited

U.S. PATENT DOCUMENTS

| | | | | |
|---|---|---|---|---|
| 6,085,372 | A * | 7/2000 | James ................ | A61G 7/05784 5/713 |
| 6,119,292 | A * | 9/2000 | Haas ...................... | A61G 7/001 5/713 |
| 6,351,862 | B1 | 3/2002 | Henley et al. | |
| 6,584,628 | B1 * | 7/2003 | Kummer ................ | A61G 7/002 5/713 |
| 6,691,346 | B2 | 2/2004 | Osborne et al. | |
| 6,978,500 | B2 | 12/2005 | Osborne et al. | |
| 7,171,708 | B2 | 2/2007 | Osborne et al. | |
| 7,570,152 | B2 | 8/2009 | Smith et al. | |
| 8,258,963 | B2 | 9/2012 | Dixon et al. | |
| 8,334,779 | B2 | 12/2012 | Zerhusen et al. | |
| 8,409,095 | B1 | 4/2013 | Marquis | |
| 8,525,680 | B2 | 9/2013 | Riley et al. | |
| 8,756,078 | B2 | 6/2014 | Collins, Jr. et al. | |
| 8,950,026 | B2 | 2/2015 | Valdemoros Tobia et al. | |
| 8,984,685 | B2 | 3/2015 | Robertson et al. | |
| 9,015,885 | B2 | 4/2015 | Chapin | |
| 9,149,190 | B2 | 10/2015 | Mayoras, Jr. | |
| 9,204,823 | B2 | 12/2015 | Derenne et al. | |
| 9,320,444 | B2 | 4/2016 | Hayes et al. | |
| 9,569,591 | B2 | 2/2017 | Vanderpohl, III | |
| 9,788,800 | B2 | 10/2017 | Mayoras, Jr. | |
| 10,238,566 | B2 * | 3/2019 | Heimbrock ............ | A61G 7/053 |
| 10,463,526 | B1 * | 11/2019 | Zur ...................... | A61H 9/0078 |
| 10,905,609 | B2 | 2/2021 | Childs et al. | |
| 11,484,452 | B2 | 11/2022 | Childs et al. | |
| 2002/0014951 | A1 | 2/2002 | Kramer et al. | |
| 2004/0163175 | A1 | 8/2004 | Vogel et al. | |
| 2005/0060809 | A1 | 3/2005 | Rogers | |
| 2008/0021731 | A1 | 1/2008 | Rodgers | |
| 2009/0049610 | A1 | 2/2009 | Heimbrock et al. | |
| 2011/0035057 | A1 | 2/2011 | Receveur et al. | |
| 2012/0151678 | A1 | 6/2012 | Richards | |
| 2012/0198627 | A1 | 8/2012 | Turner et al. | |
| 2012/0259245 | A1 | 10/2012 | Receveur | |
| 2013/0142367 | A1 | 6/2013 | Berry et al. | |
| 2014/0039351 | A1 | 2/2014 | Mix et al. | |
| 2014/0080413 | A1 | 3/2014 | Hayes et al. | |
| 2014/0094997 | A1 | 4/2014 | Hyde et al. | |
| 2014/0101861 | A1 * | 4/2014 | Gowda .............. | A61G 7/05792 5/709 |
| 2014/0169795 | A1 * | 6/2014 | Clough ................. | H04W 88/02 398/106 |
| 2014/0297327 | A1 | 10/2014 | Heil et al. | |
| 2014/0338124 | A1 | 11/2014 | Newkirk et al. | |
| 2014/0346836 | A1 * | 11/2014 | Briggs ................. | A61G 7/1021 297/452.41 |
| 2015/0157521 | A1 | 6/2015 | Williams et al. | |
| 2016/0022218 | A1 | 1/2016 | Hayes et al. | |
| 2016/0235610 | A1 | 8/2016 | Drake | |
| 2016/0331617 | A1 | 11/2016 | Stryker et al. | |
| 2016/0367420 | A1 | 12/2016 | Zerhusen et al. | |
| 2017/0143565 | A1 | 5/2017 | Childs et al. | |
| 2017/0143566 | A1 | 5/2017 | Elku et al. | |
| 2021/0100706 | A1 | 4/2021 | Childs et al. | |
| 2021/0322241 | A1 | 10/2021 | Stryker et al. | |
| 2023/0017679 | A1 | 1/2023 | Childs et al. | |

FOREIGN PATENT DOCUMENTS

| | | | |
|---|---|---|---|
| EP | 3058869 | A1 | 8/2016 |
| KR | 20130076922 | A | 7/2013 |
| KR | 20160080898 | A | 7/2016 |
| WO | 2006023447 | A2 | 3/2006 |
| WO | 2014149392 | A1 | 9/2014 |

OTHER PUBLICATIONS

English language abstract, and machine-assisted English language translation of Korean Publication No. KR 2013-0076922 extracted from www.espacenet.com on May 2, 2018; 8 pages.

English language abstract, and machine-assisted English language translation of Korean Publication No. KR 2016-0080898 A extracted from www.espacenet.com on Sep. 12, 2017; 12 pages.

Hill-Rom, "Centrella (TM) Smart+ Bed, Therapeautic Surfaces", Sep. 20, 2017; 3 pages.

Hill-Rom, "Centrella Smart + Bed Brochure", Sep. 27, 2017, 11 pages.

Stryker, "InTouch Critical Care Bed Model FL27 (2130/2140) Operations Manual—Optional Pendant Control", 2130-009-001 Rev C, Apr. 2008, p. 25.

* cited by examiner

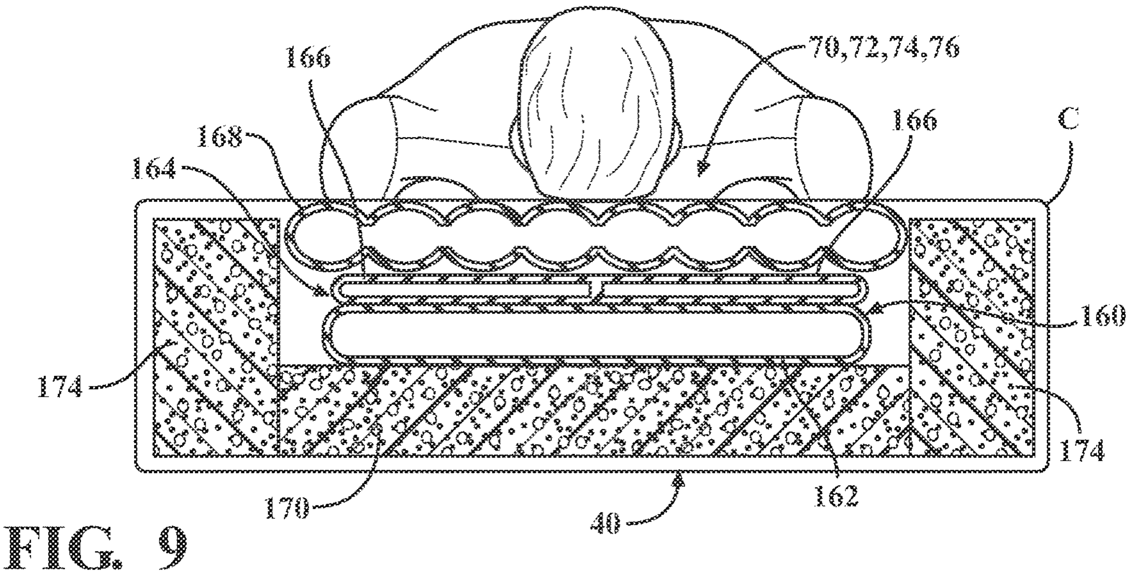
FIG. 9
FIG. 10A
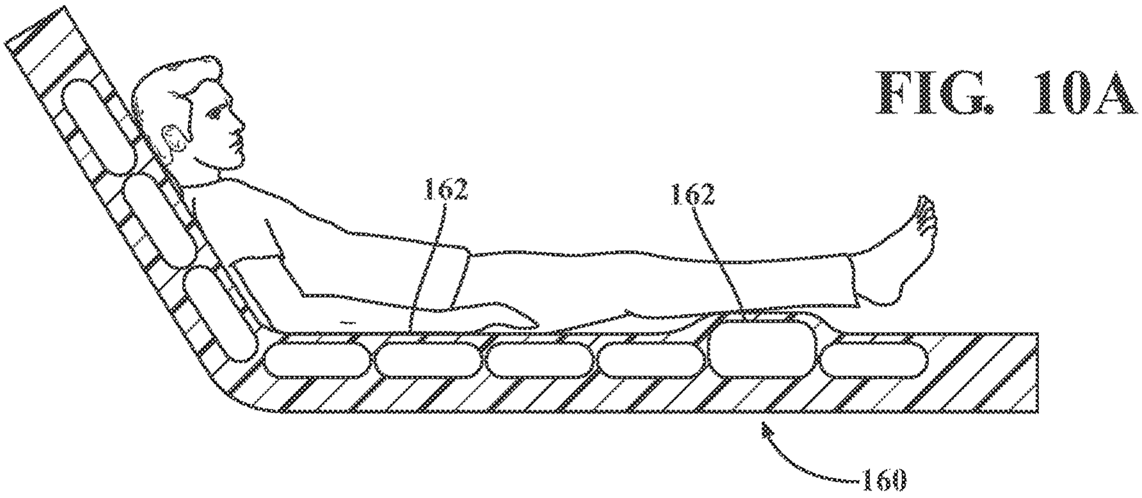
FIG. 10B
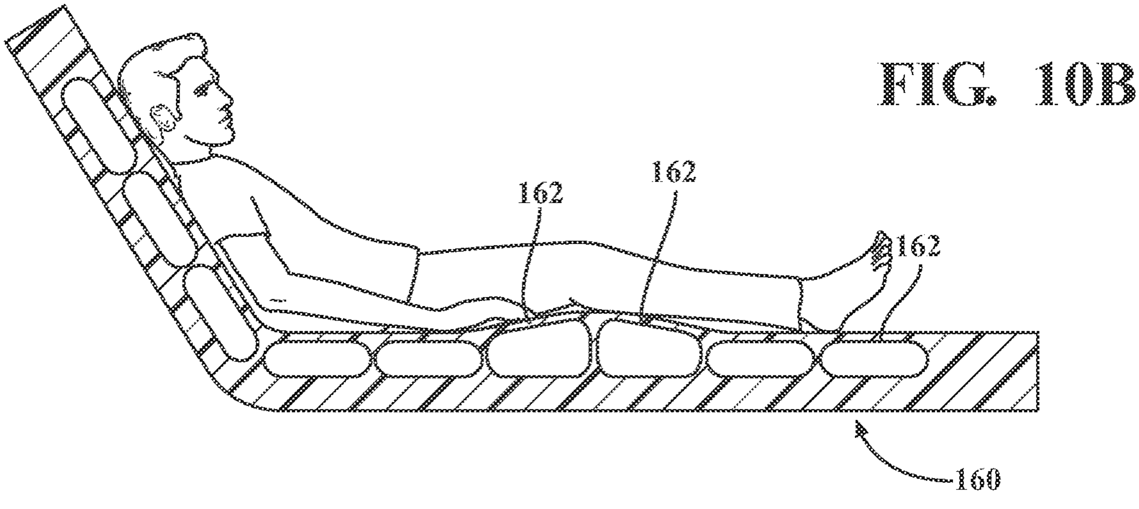

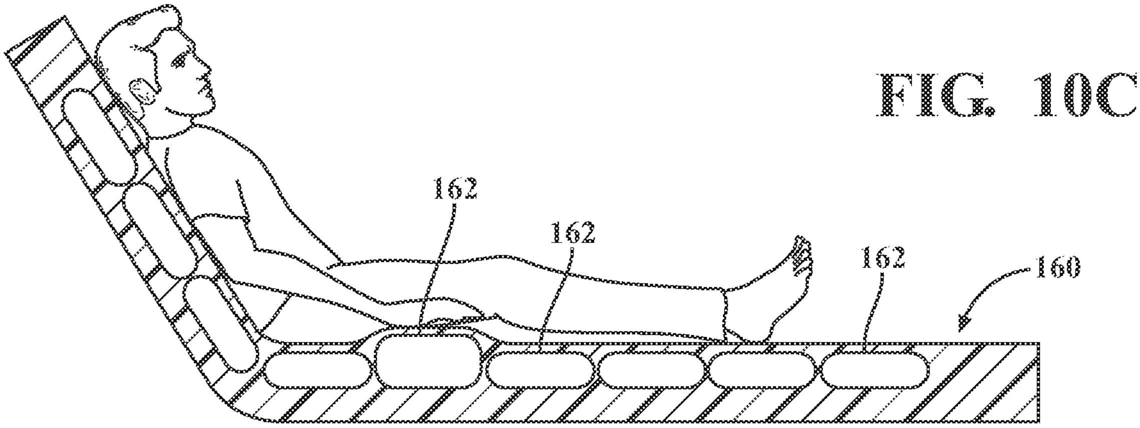
FIG. 10C
FIG. 11A
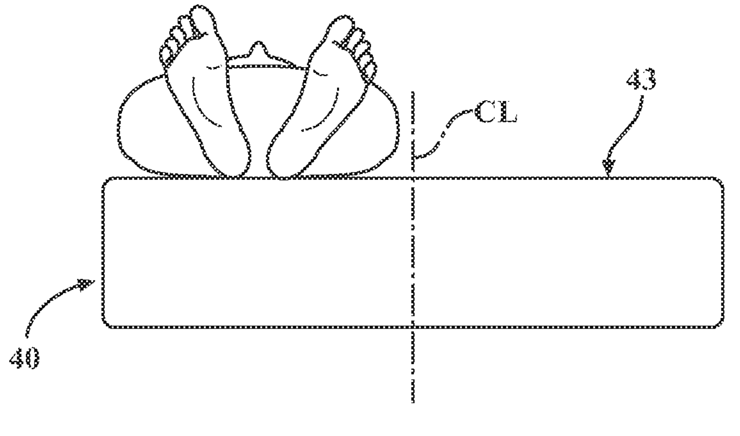
FIG. 11B
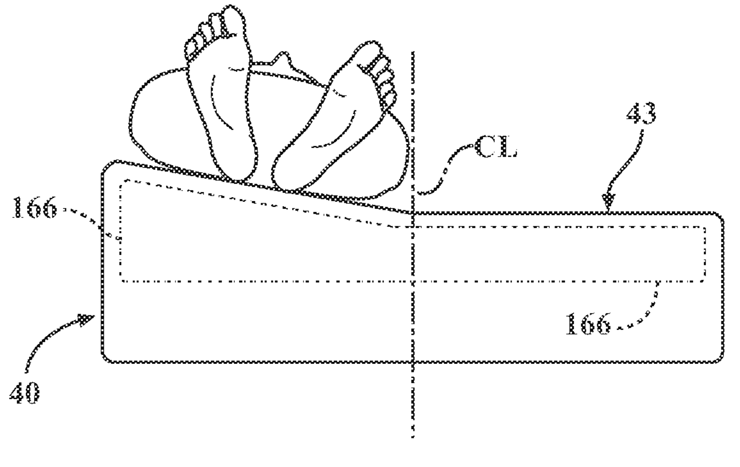

PATIENT SUPPORT SYSTEMS AND METHODS FOR ASSISTING CAREGIVERS WITH PATIENT CARE

CROSS-REFERENCE TO RELATED APPLICATIONS

This application is a Continuation of U.S. patent application Ser. No. 17/952,683 filed on Sep. 26, 2022, which is a Continuation of U.S. patent application Ser. No. 17/125,142 filed on Dec. 17, 2020 and issued as U.S. Pat. No. 11,484,452 on Nov. 1, 2022, which is a Continuation of U.S. patent application Ser. No. 15/353,179 filed on Nov. 16, 2016 and issued as U.S. Pat. No. 10,905,609 on Feb. 2, 2021, which claims the benefit of and priority to U.S. Provisional Patent Application No. 62/258,156 filed on Nov. 20, 2015, the disclosures of each of which are hereby incorporated by reference in their entirety.

BACKGROUND

Patient support systems facilitate care of patients in a health care setting. Patient support systems comprise patient support apparatuses such as, for example, hospital beds, stretchers, cots, tables, and wheelchairs. Conventional patient support apparatuses comprise a base and a patient support surface upon which the patient is supported. Often, these patient support apparatuses have one or more powered devices to perform one or more functions on the patient support apparatus. These functions can include lifting and lowering the patient support surface, raising a patient from a slouched position, turning a patient, centering a patient, extending a length or width of the patient support apparatus, and the like. When the caregiver wishes to operate a powered device to perform a function, the caregiver actuates a user input device, often in the form of a button on a control panel. To continue performing the function, the caregiver is required to continue depressing the button until a desired outcome is achieved, e.g., the patient support surface is lifted to a desired height, the patient is sufficiently raised from the slouched position to a desired position, etc. As a result, the caregiver's hand is occupied by the user input device and unable to provide much assistance to the patient.

A patient support system designed to free one or more hands of the caregiver to perform other tasks and overcome one or more of the aforementioned challenges is desired.

BRIEF DESCRIPTION OF THE DRAWINGS

FIG. 9 is another cross-sectional view of the mattress taken laterally across the mattress.

FIGS. 10A, 10B, and 10C are illustrations of raising a patient from a slouched position to a raised position.

FIGS. 11A and 11B are illustrations of centering the patient relative to a centerline.

DETAILED DESCRIPTION

Figure 1:
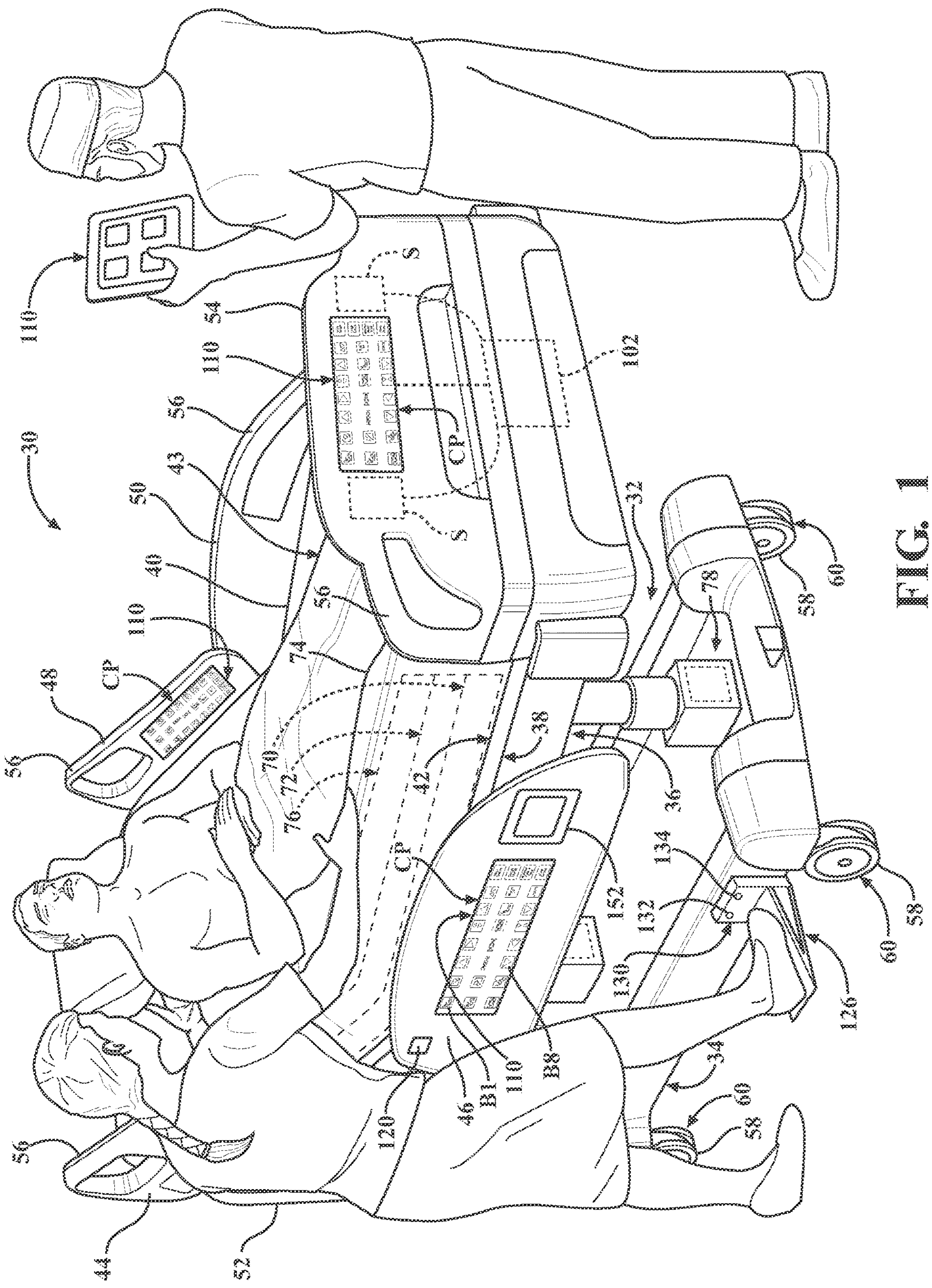
FIG. 1 is perspective view of a patient support apparatus.

Referring to FIG. 1, a patient support system comprising a patient support apparatus 30 is shown for supporting a patient in a health care setting. The patient support apparatus 30 illustrated in FIG. 1 comprises a hospital bed. In other embodiments, however, the patient support apparatus 30 may comprise a stretcher, cot, table, wheelchair, or similar apparatus utilized in the care of a patient.

A support structure 32 provides support for the patient. The support structure 32 illustrated in FIG. 1 comprises a base 34 and an intermediate frame 36. The intermediate frame 36 is spaced above the base 34. The support structure 32 also comprises a patient support deck 38 disposed on the intermediate frame 36. The patient support deck 38 comprises several sections, some of which are pivotable relative to the intermediate frame 36, such as a fowler section, a seat section, a thigh section, and a foot section. The patient support deck 38 provides a patient support surface 42 upon which the patient is supported.

A mattress 40 is disposed on the patient support deck 38. The mattress 40 comprises a secondary patient support surface 43 upon which the patient is supported. The base 34, intermediate frame 36, patient support deck 38, and patient support surfaces 42, 43 each have a head end and a foot end corresponding to designated placement of the patient's head and feet on the patient support apparatus 30. The construction of the support structure 32 may take on any known or conventional design, and is not limited to that specifically set forth above. In addition, the mattress 40 may be omitted in certain embodiments, such that the patient rests directly on the patient support surface 42.

Side rails 44, 46, 48, 50 are coupled to the intermediate frame 36 and thereby supported by the base 34. A first side rail 44 is positioned at a right head end of the intermediate frame 36. A second side rail 46 is positioned at a right foot end of the intermediate frame 36. A third side rail 48 is positioned at a left head end of the intermediate frame 36. A fourth side rail is positioned at a left foot end of the intermediate frame 36. If the patient support apparatus is a stretcher or a cot, there may be fewer side rails. The side rails 44, 46, 48, 50 are movable between a raised position in which they block ingress and egress into and out of the patient support apparatus 30, an intermediate position, and a lowered position in which they are not an obstacle to such ingress and egress. In still other configurations, the patient support apparatus 30 may not include any side rails.

A headboard 52 and a footboard 54 are coupled to the intermediate frame 36. In other embodiments, when the headboard 52 and footboard 54 are included, the headboard 52 and footboard 54 may be coupled to other locations on the patient support apparatus 30, such as the base 34. In still other embodiments, the patient support apparatus 30 does not include the headboard 52 and/or the footboard 54.

Caregiver interfaces 56, such as handles, are shown integrated into the footboard 54 and side rails 44, 46, 48, 50 to facilitate movement of the patient support apparatus 30 over floor surfaces. Additional caregiver interfaces 56 may be integrated into the headboard 52 and/or other components of the patient support apparatus 30. The caregiver interfaces 56 are graspable by the caregiver to manipulate the patient support apparatus 30 for movement.

Other forms of the caregiver interface 56 are also contemplated. The caregiver interface may comprise one or more handles coupled to the intermediate frame 36. The caregiver interface may simply be a surface on the patient support apparatus 30 upon which the caregiver logically applies force to cause movement of the patient support apparatus 30 in one or more directions, also referred to as a push location. This may comprise one or more surfaces on the intermediate frame 36 or base 34. This could also comprise one or more surfaces on or adjacent to the headboard 52, footboard 54, and/or side rails 44, 46, 48, 50. In other embodiments, the caregiver interface may comprise separate handles for each hand of the caregiver. For example, the caregiver interface may comprise two handles.

Wheels 58 are coupled to the base 34 to facilitate transport over the floor surfaces. The wheels 58 are arranged in each of four quadrants of the base 34 adjacent to corners of the base 34. In the embodiment shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some embodiments, the wheels 58 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not include any wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient support apparatus 30. A fifth wheel may also be arranged substantially in a center of the base 34.

Figure 2:
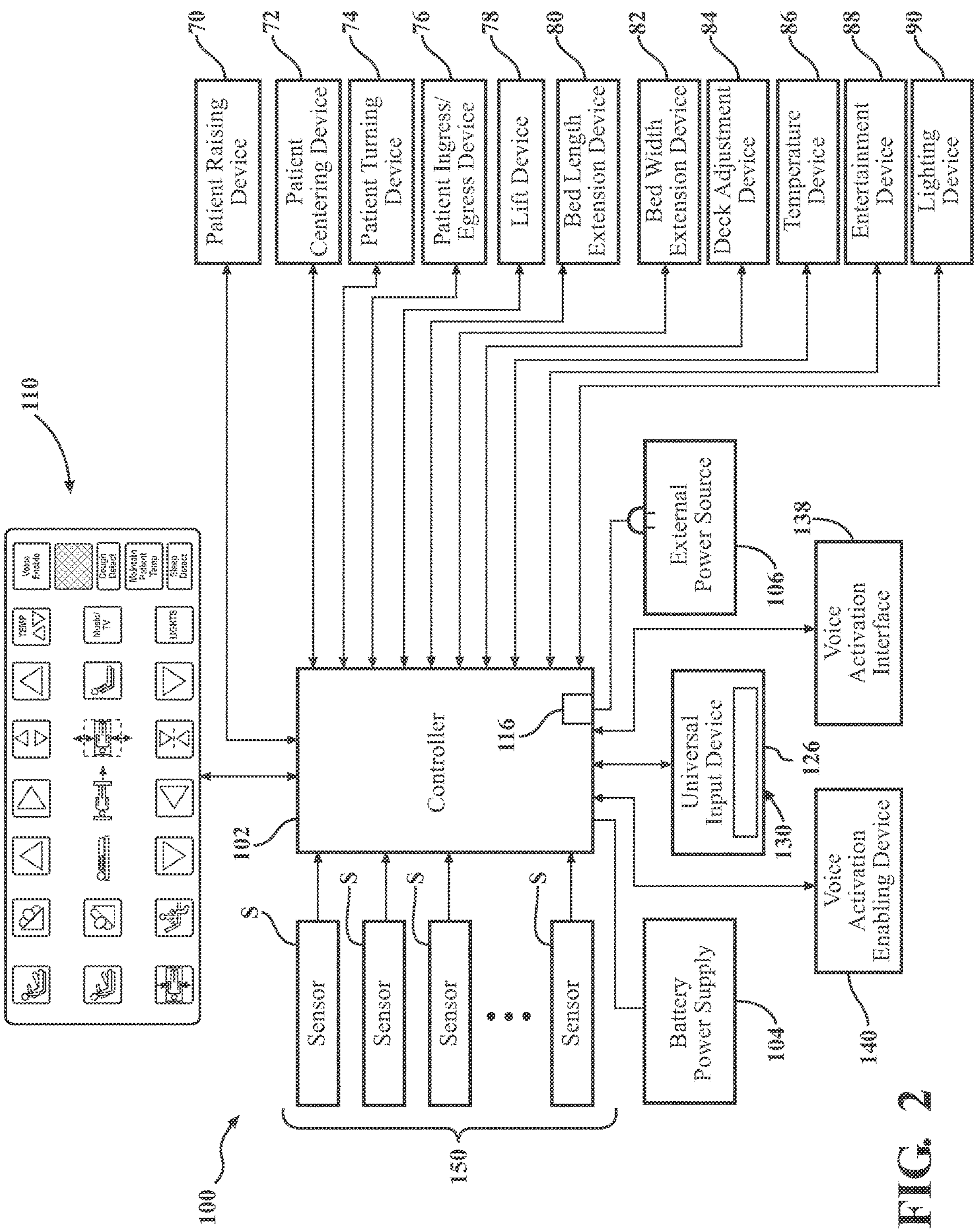
FIG. 2 is a schematic view of a control system.

Referring to FIG. 2, the patient support system may comprise one or more powered devices 70-90, each configured to perform one or more predetermined functions. The powered devices 70-90 utilize one or more components that require electricity. The powered devices 70-90 may comprise powered adjustment devices 70-84, such as a patient raising device a patient centering device 72, a patient turning device 74, a patient ingress/egress device 76, a lift device 78, a bed length extension device 80, a bed width extension device 82, and a deck adjustment device 84. The powered devices 70-90 may also comprise powered comfort devices, such as a temperature device 86, an entertainment device 88, and a lighting device 90. Other powered devices are also contemplated. For instance, percussion devices, compression devices, vibration devices, and other patient therapy devices may also be employed.

A control system 100 is provided to control operation of the powered devices 70-90. The control system 100 comprises a controller 102 having one or more microprocessors for processing instructions or for processing an algorithm stored in memory 116 to control operation of the powered devices 70-90. Additionally or alternatively, the controller 102 may comprise one or more microcontrollers, field programmable gate arrays, systems on a chip, discrete circuitry, and/or other suitable hardware, software, or firmware that is capable of carrying out the functions described herein. The controller 102 may be carried on-board the patient support apparatus 30, or may be remotely located. In one embodiment, the controller 102 is mounted to the base 34. In other embodiments, the controller 102 is mounted to the footboard 54. The controller 102 may comprise one or more subcontrollers configured to control all the powered devices 70-90 or one or more subcontrollers for each of the powered devices 70-90. Power to the powered devices 70-90 and/or the controller 102 may be provided by a battery power supply 104 or an external power source 106.

The controller 102 is coupled to the powered devices 70-90 in a manner that allows the controller 102 to control the powered devices 70-90. The controller 102 may communicate with the powered devices 70-90 via wired or wireless connections. The controller 102 generates and transmits control signals to the powered devices 70-90, or components thereof, to operate their associated actuators, control their pumps, control their valves, or otherwise cause the powered devices 70-90 to perform one of more of the desired functions.

The controller 102 controls operation of the powered devices 70-90. More specifically, the controller 102 may monitor a current state of the powered devices 70-90 and determine desired states in which the powered devices 70-90 should be placed, based on one or more input signals that the controller 102 receives from one or more user input devices 110. The state of the powered device 70-90 may be a position, a relative position, a pressure, an intensity, a frequency, an amplitude, a period, an angle, an energization status (e.g., on/off), or any other parameter of the powered device 70-90.

The caregiver, or other user, may actuate one of the user input devices 110, which transmits a corresponding input signal to the controller 102, and the controller 102 controls operation of the powered device 70-90 based on the input signal. Operation of the powered device 70-90 may continue until the caregiver discontinues actuation of the user input device 110, e.g., until the input signal is terminated. In other words, depending on which user input device 110 is engaged, i.e., what input signal is received by the controller 102, the controller 102 controls operation of one of the powered devices 70-90. In certain embodiments, the controller 102 selects or initiates operation of one of the powered devices 70-90 based on the input signals received by the controller 102.

The user input devices 110 may comprise devices capable of being actuated by a user, such as the caregiver or the patient. The user input devices 110 may be configured to be actuated in a variety of different ways, including but not limited to, mechanical actuation (hand, foot, finger, etc.), hands-free actuation (voice, foot, etc.), and the like. Each user input device 110 may comprise a button, a gesture sensing device for monitoring motion of hands, feet, or other body parts of the caregiver (such as through a camera), a microphone for receiving voice activation commands, a foot pedal, and a sensor (e.g., infrared sensor such as a light bar or light beam to sense a user's body part, ultrasonic sensor, etc.). Additionally, the buttons/pedals can be physical buttons/pedals or virtually implemented buttons/pedals such as through optical projection or on a touchscreen. The buttons/pedals may also be mechanically connected or drive-by-wire type buttons/pedals where a user applied force actuates a sensor, such as a switch or potentiometer. It should be appreciated that any combination of user input devices 110 may also be utilized for any of the powered devices 70-90. The user input devices 110 may be located on one of the side rails 44, 46, 48, 50, the headboard 52, the footboard 54, or other suitable locations. The user input devices 110 may also be located on a portable electronic device (e.g., iWatch®, iPhone®, iPad®, or similar electronic devices), as shown in FIG. 1.

Figure 3:
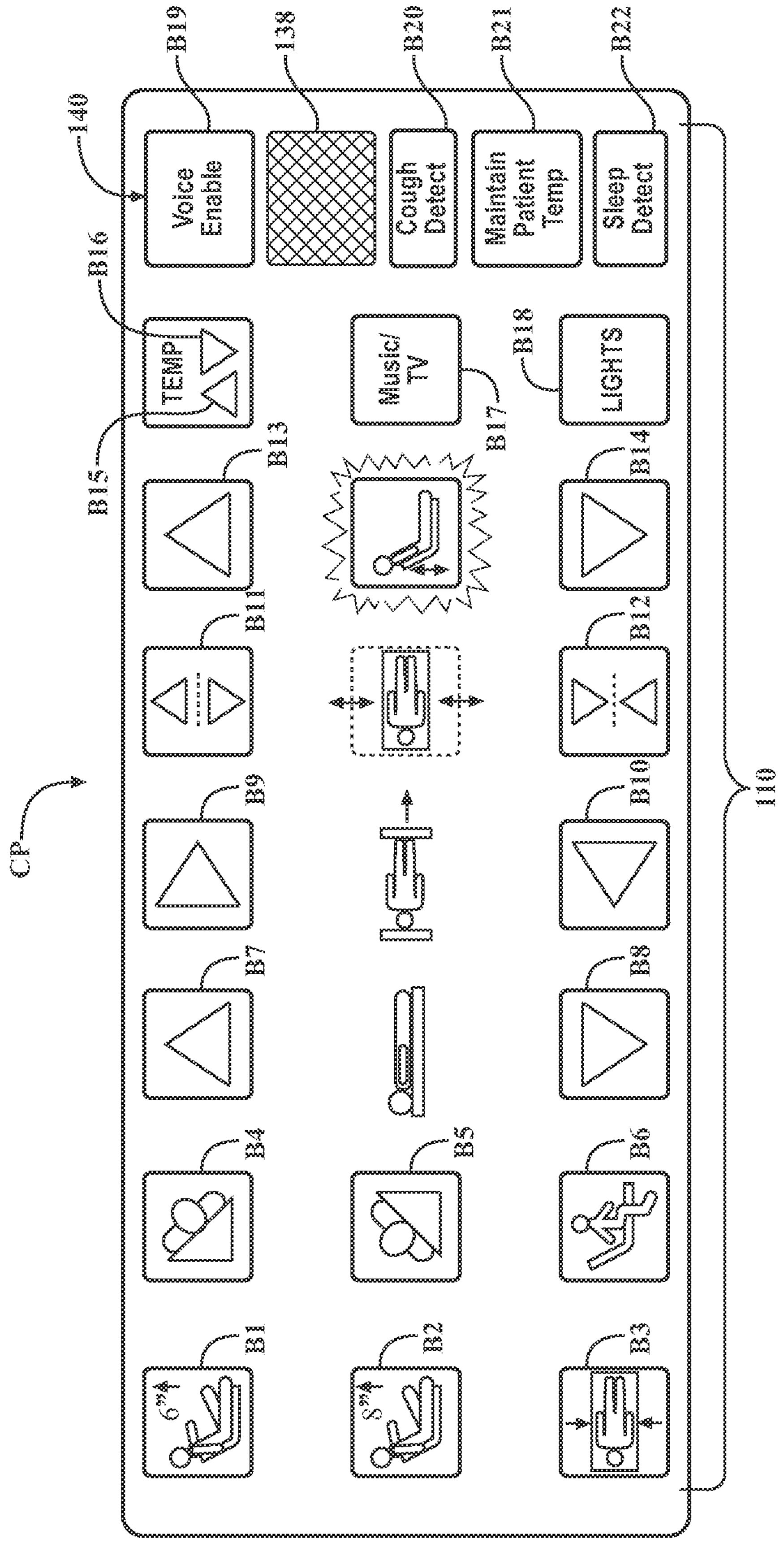
FIG. 3 is an illustration of a control panel.

In the embodiment shown in FIG. 3, the patient support apparatus 30 comprises a user control panel CP that comprises numerous user input devices 110 in the form of buttons B1-B22. The buttons B1-B22 may be mechanical press buttons, virtual buttons on a touch screen, and the like. While buttons have been shown in the illustrated example, any of the aforementioned user input devices 110 may be used to control the powered devices 70-90. Furthermore, as should be appreciated, the patient support apparatus 30 may comprise any number of powered devices 70-90 and the corresponding user input devices 110.

Each of the buttons B1-B14 control different predetermined functions of one or more of the powered adjustment devices 70-84. The button B1, upon actuation, causes the controller 102 to energize the patient raising device 70 to raise the patient six inches toward the head end of the patient support deck 38 (as may be needed when the patient is in a slouched position). The button B2, upon actuation, causes the controller 102 to energize the patient raising device 70 to raise the patient eight inches toward the head end of the patient support deck 38 (as may be needed when the patient is in a slouched position and six inches of raising is not enough). The button B3, upon actuation, causes the controller 102 to energize the patient centering device 72 to laterally urge the patient towards a longitudinal centerline of the mattress 40. The buttons B4 and B5, upon actuation, cause the controller 102 to energize the patient turning device 74 to turn the patient on one side or another, respectively. The button B6, upon actuation, causes the controller 102 to energize the patient ingress/egress device 76 to enable easier ingress/egress for the patient. The buttons B7 and B8, upon actuation, cause the controller 102 to energize the lift device 78 to lift or lower the patient support surface 42 relative to the floor surface, respectively. The buttons B9 and B10, upon actuation, cause the controller 102 to energize the bed length extension device 80 to lengthen or shorten the patient support apparatus to accommodate taller or shorter patients. The buttons B11 and B12, upon actuation, cause the controller 102 to energize the bed width extension device 82 to widen or narrow the patient support apparatus 30 to accommodate larger or smaller patients, respectively. The buttons B13 and B14, upon actuation, cause the controller 102 to energize the deck adjustment device 84 to adjust a position of one or more of the deck sections of the patient support deck 38, such as the fowler section. Other buttons, not shown, are contemplated to adjust other deck sections.

In order for the caregiver to continue operating one of the powered adjustment devices 70-84 to perform the desired function using one of the buttons B1-B14 (or other user input devices 110), the caregiver may be required to continue actuating (e.g., continue depressing or continue touching) the button B1-B14 until the caregiver is satisfied with the adjustment that was made to the powered adjustment device 70-84. Other user input devices 110 can be continually actuated in other ways, depending on their mode of actuation. For instance, an infrared sensor that generates a light beam can be continually actuated by continually breaking the light beam. Similarly, a gesture sensing device can be continually actuated by continually sensing an actuating gesture.

In some cases, this requirement that the caregiver continually actuate (e.g., continually depress or continually touch) the button B1-B14 (or other user input device 110) to cause energization of the powered adjustment device 70-84 prevents the caregiver from performing other tasks that could be performed instead, such as assisting the patient with other needs. Accordingly, in certain embodiments described herein, the user input devices 110 are configured to also enable continued operation (i.e., energization) of the powered adjustment device 70-84, even after the caregiver ceases to actuate the user input device 110, e.g., after the caregiver ceases to depress or touch one of the buttons B1-B14, for a predetermined period of time, or until the desired adjustment is complete.

A universal input device 126 can be employed to continue operation of the powered adjustment device 70-84 in combination with the user input device 110. In some embodiments, in response to an initial actuation of the user input device 110, the controller 102 may activate the universal input device 126 so that the universal input device 126 can be later actuated by the caregiver to continue the same operation of the powered adjustment device 70-84 as was provided by actuation of the user input device 110. However, the universal input device 126 may be actuated without continual use of one or more of the caregiver's hands to free the caregiver to perform other tasks. In essence, the universal input device 126 assumes the functionality of the user input device 110 to allow additional operation of the same powered adjustment device 70-84 without continually occupying one or more of the caregiver's hands by virtue of actuation of the universal input device 126. In these embodiments, the controller 102 assigns the same functionality as the user input device 110 to the universal input device 126. Accordingly, the same function associated with the user input device 110 may continue in response to the caregiver continually actuating the universal input device 126.

In certain embodiments, the universal input device 126 may comprise a different form of actuatable input than the user input device 110. For instance, the user input device 110 may comprise a button, while the universal input device 126 comprises a foot pedal. In other embodiments, the user input device 110 may comprise a button, while the universal input device 126 comprises an infrared light beam. Various combinations of different forms for the user input device 110 and the universal input device 126 are contemplated. In some cases, the user input device 110 and the universal input device 126 may have the same form, but in different locations. For instance, the universal input device 126 may be a button on the base 34 while the user input device 110 is a button on one of the side rails 44, 46, 48, 50, remote from the button on the base 34. In the embodiment shown in FIGS. 1 and 4, the user input devices 110 comprise buttons, while the universal input device 126 comprises a foot pedal. The foot pedal is a drive-by-wire type foot pedal that comprises a switch 125 (see FIG. 4) that is actuated when the foot pedal is depressed. A spring 127 urges the foot pedal back to an original pre-depressed position.

Figure 4:
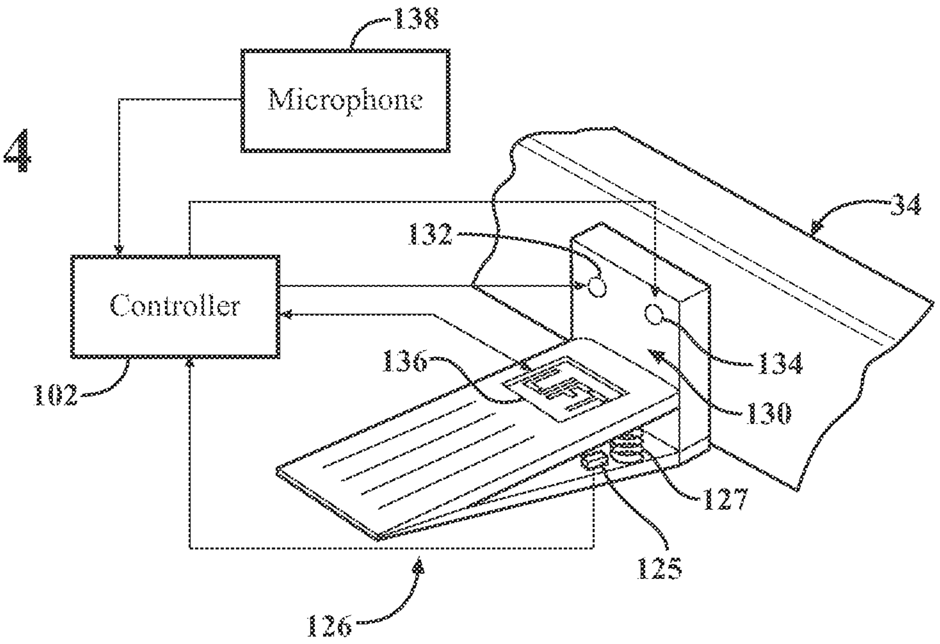
FIG. 4 is a perspective and schematic view of a universal input device.

The universal input device 126 may comprise the same type of actuatable input as any of the different types of user input devices described above. The universal input device 126 may be located anywhere on the patient support apparatus 30 or remote from the patient support apparatus 30. The universal input device 126 may be mounted to the base 34, the intermediate frame 36, the side rails 44, 46, 48, 50, the headboard 52, the footboard 54, or other suitable locations. The universal input device 126 may also be located on a portable electronic device. In FIGS. 1 and 4, the universal input device 126 is shown mounted to the base 34.

To enable the universal input device 126, one of the user input devices 110 is actuated by the caregiver to generate a first input signal associated with one of the powered adjustment devices 70-84 to select or initiate operation of the powered adjustment device 70-84. The controller 102 then assigns a functionality to the universal input device 126 based on the first input signal provided by the user input device 110 such that, after assigning the functionality to the universal input device 126, the controller 102 is configured to control the powered adjustment device 70-84 while receiving a second input signal from the universal input device 126, i.e., a universal input signal, to perform the assigned function. In these embodiments, both the user input device 110 and the universal input device 126 are capable of causing the controller 102 to energize the powered adjustment device 70-84 to perform the associated function after the functionality has been assigned to the universal input device 110. In essence, the universal input device 126 acts as a secondary input device capable of operating the powered adjustment device 70-84. In other words, the user input device 110 is not merely capable of identifying to the controller 102 which function to assign to the universal input device 126, but also functions to directly cause operation of the powered adjustment device 70-84.

In some versions, the controller 102 requires that the user input device 110 and the universal input device 126 be actuated simultaneously in order for the functionality of the universal input device 126 to be enabled (e.g., the first input signal and the universal input signal are received simultaneously by the controller 102). For instance, if the caregiver desires the universal input device 126 to function to continue operation of the powered adjustment device then the caregiver must actuate the user input device 110 and the universal input device 126 before ceasing actuation of the user input device 110 (e.g., the caregiver is required to actuate the button and the foot pedal simultaneously). As a result, the controller 102 is configured to continue operating the powered adjustment device 70-84 based on the universal input signal received from the universal input device 126 after termination of the first input signal. Essentially, the universal input device 126 is assigned by the controller 102 to perform the same functionality as the user input device 110. In this embodiment, if the universal input device 126 fails to be actuated simultaneously with the user input device 110, then the universal input device 126 is not assigned any functionality by the controller 102 and will not function to continue operation of the powered adjustment device 70-84.

In other versions, the user input device 110 and the universal input device 126 do not need to be actuated simultaneously in order for the functionality of the universal input device 126 to be enabled (e.g., the first input signal and the universal input signal are not required to be received by the controller 102 simultaneously). In these versions, for instance, the controller 102 may be configured to continue operating the powered adjustment device 70-84 when the universal input device 126 is actuated within a predetermined amount of time after terminating actuation of the user input device 110 (e.g., the foot pedal is actuated within a predetermined amount of time after releasing the button).

Furthermore, in certain embodiments, the controller 102 may be configured to continue operating the powered adjustment device 70-84 until the universal input signal is terminated (e.g., the foot pedal is released) or a predetermined function to be performed by the powered adjustment device 70-84 is complete.

As previously discussed, the user input devices 110, e.g., the buttons B1-B14, are capable of generating numerous input signals associated with each of the powered adjustment devices 70-84. So, for instance, each of the buttons B1-B14 generate a different first input signal associated with each of the different functions assigned to the buttons B1-B14. The controller 102 is configured to recognize which input signal is being received so that the controller 102 can operate the powered adjustment devices 70-84 appropriately to perform the assigned functions. The universal input device 126 is considered universal because the controller 102 is able to program the universal input device 126 by assigning different functionalities to the universal input device 126, depending on which first input signal is received. In some cases, the universal input device 126 can be programmed to function in the same manner as any of the buttons B1-B 14.

Referring to FIG. 1, in one example, the controller 102 may determine that the caregiver wishes to raise the patient from a slouched position in the patient support apparatus 30 as indicated by the caregiver actuating the button B1. Actuation of the button B1 transmits the first input signal to the controller 102. The controller 102 may respond by selecting or initiating operation of the patient raising device 70 (described in detail below). During normal operation, the patient raising device 70 may continue changing its configuration until the caregiver discontinues actuation of the button B1. However, in response to actuation of the universal input device 126, either simultaneously with depressing the button B1, or within a predetermined time after depressing the button B1, the controller 102 may activate the universal input device 126 such that actuation of the universal input device 126 enables continued operation of the patient raising device 70. For a certain duration, the universal input device 126 may then be actuated by the caregiver's foot to continue operation of the patient raising device 70 in the absence of actuation of the button B1. This can be particularly helpful when the caregiver is required to use his/her hands to manipulate the patient in some manner while continuing to provide input to the controller 102 to continue operation of the patient raising device 70, as shown in FIG. 1. For instance, the caregiver may initiate operation of the patient raising device 70 using the button B1, but after operation is initiated may cease actuating the button B1 and instead actuate the universal input device 126 to continue operation of the patient raising device 70 freeing the caregiver's hands to assist the patient in being repositioned.

By way of further example, once raising the patient is completed (as indicated by the patient raising device 70 automatically stopping after raising the patient six inches, after a predetermined period of time has elapsed, or after the caregiver has released the foot pedal), the caregiver may now wish to lower the patient support surface 42 using the lift device 78 to enable the patient to exit the patient support apparatus 30. Again, however, the caregiver wishes to keep his/her hands free. Accordingly, the caregiver selects the button B8 to lower the patient support surface 42 and the controller 102 starts operation of the lift device 78. At the same time, or within a predetermined amount of time after selecting the button B8, the caregiver again actuates the universal input device 126 (e.g., the foot pedal). As a result, the controller 102 recognizes that the caregiver wishes to continue operation of the lift device 78 with the universal input device 126 and accordingly re-assigns the universal input device 126 the same functionality as the button B8. Thereafter, the caregiver is able to continue lowering the patient support surface 42 by actuating the universal input device 126, e.g., by depressing the foot pedal.

Accordingly, upon receiving different input signals from the user input devices 110, the controller 102 assigns different functionalities to the universal input device 126. As a result, the universal input device 126 may be able to control one or more of the powered adjustment devices 70-84 at different times. Hence the universal input device 126 is universally configurable. It should be appreciated that a plurality of universal input devices 126 may be employed to control the powered adjustment devices 70-84 on the patient support apparatus 30.

In some embodiments, if two or more user input devices 110 are actuated simultaneously to generate two or more input signals, the controller 102 may assign compound functionality to the universal input device 126 based on the two or more functions associated with the two or more input signals such that the universal input device 126 is able to control two or more powered devices 70-84 simultaneously. For instance, the caregiver may actuate buttons B9 and B11 simultaneously such that associated input signals are received by the controller 102 simultaneously. In response, the controller 102 assigns the universal input device 126 compound functionality such that, upon actuation of the universal input device 126, both the bed length extension device 80 and the bed width extension device 82 are energized simultaneously to both lengthen and widen the patient support apparatus 30 at the same time.

Referring to FIG. 4, the universal input device 126 may comprise an indicator system 130. The indicator system 130 may comprise a functionality indicator to indicate to the caregiver which functionality has been assigned to the universal input device 126 by the controller 102. The indicator system 130 is in communication with the controller 102. The controller 102 is configured to activate the indicator system 130 to indicate which of the functionalities the universal input device 126 is assigned. The indicator system 130 comprises at least one of a display, a speaker, and a light emitting device. In some cases, the indicator system 130 comprises multiple indicators. For instance, the indicator system 130 shown in FIG. 4 comprises light emitting diodes (LEDs) 132, 134 and a display 136. The display 136 may be an LCD, LED, or other type of display. The LEDs 132, 134 may be multi-colored LEDs or other form of light source for indicating information to the caregiver.

The LEDs 132, 134 and the display 136 are controlled by the controller 102 to indicate a current functionality of the universal input device 126. For instance, the display 136 may comprise indicia such as text, graphics, etc. to indicate the current functionality. In FIG. 4, the display 136 shows that the current functionality is to "LIFT" the patient, e.g., the universal input device 126 has been assigned the same functionality as the button B7. The indicator system 130 can be located anywhere on the patient support apparatus 30 that is suitable to indicate information to the caregiver. The indicator system 130 may also be located remote from the patient support apparatus 30, such as on a portable electronic device, nurse's station, or other location. In some embodiments, the indicator system 130 may be separate from the universal input device 126 and may comprise a single indicator or multiple indicators.

The indicator system 130 may further be utilized to indicate the status of the universal input device 126, such as indicating that the universal input device 126 is ready to be assigned a new functionality. The status of the universal input device 126 may be indicated by the controller 102 transmitting a signal to the indicator system 130 so that the LEDs 132, 134 emit light of a first color, such as green, to indicate that the universal input device 126 is ready to receive a new functionality. Once the new functionality is assigned, the LEDs 132, 134 may emit light of a second color, such as blue, to indicate that the universal input device 126 is ready to transmit the universal input signal to the controller 102 to perform the new function.

The indicator system 130 may be utilized to indicate that a predetermined period of time has elapsed since the universal input device 126 has been actuated (e.g. since the controller 102 has received the universal input signal). For instance, after a functionality has been assigned to the universal input device 126, the universal input device 126 must be used continuously for a predetermined period of time, and any periods of non-use that exceed a predetermined threshold, may cause the controller 102 to send a signal to the LEDs 132, 134 to change from blue to another color, such as yellow, to indicate that the most recent functionality assignment of the universal input device 126 is about to expire, after which the universal input device 126 will no longer be functional. The predetermined threshold may comprise 1, 10, 30, 60, 120, or 180 seconds, or may comprise greater than 1 second, but less than 10, 30, 60, 120, or 180 seconds. In other words, the LEDs 132, 134, when yellow, indicate that the controller 102 has not received the universal input signal from the universal input device 126 for a period of time exceeding the predetermined threshold. The LEDs 132, 134 may also be configured to emit light of another color, such as red, to indicate that the universal input device 126 is nonfunctional.

Figure 5:
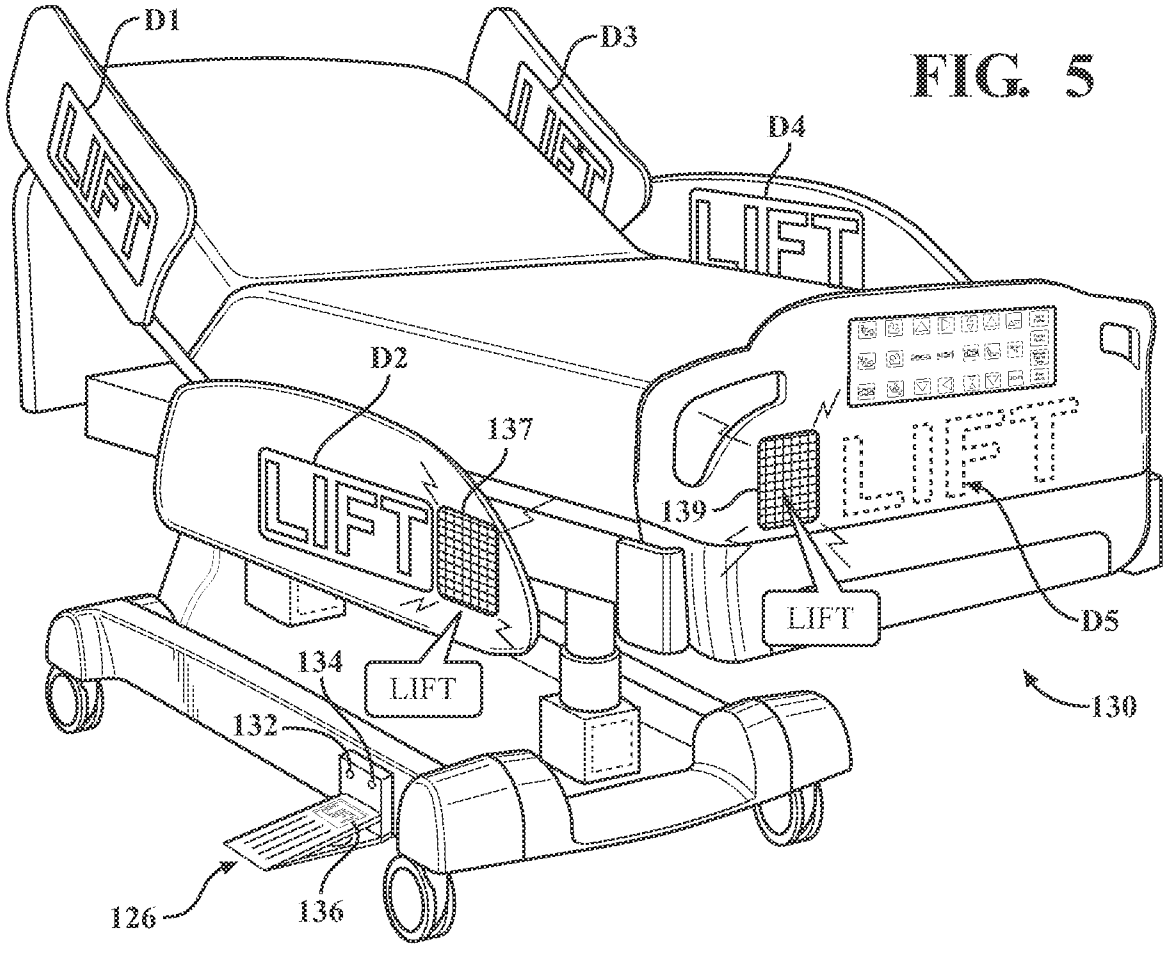
FIG. 5 is a perspective view of a patient support apparatus illustrating an indicator system.

As shown in FIG. 5, in other embodiments, the indicator system 130 may comprise additional displays D1-D5 in communication with the controller 102 to be controlled by the controller 102. These displays D1-D5 are integrated into the side rails 44, 46, 48, 50 and footboard 54 to additionally show the current functionality or status of the universal input device 126. These displays D1-D5 may comprise LCD, LED, or other types of displays. As shown, the displays D1-D5 are all illustrating that the current functionality assigned to the universal input device 126 is "LIFT." The patient support apparatus 30 could also have speakers 137, 139 to provide voice or audible feedback of the functionality as well, as shown.

In some embodiments, referring to FIGS. 2 and 3, the user input device 110 comprises a voice actuation interface 138 in communication with the controller 102. The voice actuation interface 138 may comprise a microphone in communication with the controller 102 to receive voice activation commands from the caregiver. The voice activation commands are associated with functions of the powered adjustment devices 70-84 in the same manner as buttons B1-B14. The controller 102 is configured to assign functionalities to the universal input device 126 based on the voice activation commands such that, after assigning a functionality to the universal input device 126, the controller 102 is configured to control the appropriate powered adjustment device 70-84 while receiving the universal input signal from the universal input device 126 to perform the associated function. For example, if the caregiver wishes to assign the same functionality as button B1 to the universal input device 126, but using voice activation commands, the user verbally commands "RAISE SIX INCHES" in the vicinity of the voice activation interface 138. In response to receiving and recognizing this voice activation command using conventional voice recognition software, the controller 102 assigns this functionality to the universal input device 126. If instead, the user wishes to assign the same functionality as button B8 to the universal input device 126 using voice activation commands, the user verbally commands "LOWER PATIENT" in the vicinity of the voice activation interface 138. In response to receiving and recognizing this voice activation command, the controller 102 assigns this functionality to the universal input device 126. In these embodiments, the voice activation interface 138, when receiving the voice activation command and transmitting the voice activation command electronically to the controller 102, provides the first input signal used by the controller 102 to assign the functionality to the universal input device 126. In this embodiment, the voice activation interface 138 is able to provide multiple different input signals based on the different voice commands received.

A voice activation enabling device 140 communicates with the controller 102. The voice activation enabling device 140 may comprise any of the different types of user input devices described above. The voice activation enabling device 140 may be located anywhere on the patient support apparatus 30 or remote from the patient support apparatus 30. The voice activation enabling device 140 may be mounted to the base 34, the intermediate frame 36, the side rails 44, 46, 48, 50, the headboard 52, the footboard 54, or other suitable locations. The voice activation enabling device 140 may also be located on a portable electronic device.

In the embodiment shown in FIG. 3 the voice activation enabling device 140 comprises a button B19. The voice activation enabling device 140 is actuated by the caregiver to enable voice activation commands to cause the controller 102 to assign different functionalities to the universal input device 126. In some embodiments, if the voice activation enabling device 140 is not actuated before voice activation commands are made, the controller 102 will not respond to the voice activation commands. Actuation of the voice activation enabling device 140 enables the voice activation interface 138 to provide the first input signal in a manner that will cause the controller 102 to assign a functionality to the universal input device 126.

In some embodiments, the voice activation enabling device 140 may comprise an authentication protocol before enabling the voice activation interface 138. The authentication protocol may require authentication of an identification device worn by the caregiver. The identification device may comprise an identifier, such as an RFID tag/badge, or other type of identifier capable of communication with the controller 102 to identify the caregiver and enable the voice activation interface 138 once the caregiver has been identified, e.g., once an authentication signal from the identification device has been read/received and verified by the controller 102. In these embodiments, the voice activation enabling device 140 prevents operation of the powered adjustment devices 70-84 via voice commands by the patient or other non-caregivers.

In some embodiments, the universal input device 126 acts as the voice activation enabling device 140. In these embodiments, the controller 102 is configured to enable the voice activation interface 138 to receive a voice activation command upon an initial actuation of the universal input device 126, such as after an initial single depression and release of the foot pedal, for example.

In some embodiments, the voice activation interface 138 is always enabled and triggered by an initializing voice command, such that the voice activation interface 138 is ready to receive voice activation commands once the initializing voice command is given. The initializing voice command could be "ON BED" or "READY BED." In these embodiments, voice activation commands may be used to assign functionality to the universal input device 126 if given within a predetermined time after the initializing voice command is given and recognized by the controller 102.

The indicator system 130 may be used to indicate that the universal input device 126 is ready to receive voice activation commands. For instance, after initial actuation of the universal input device 126 to enable the voice activation interface 138, the controller 102 may activate the LEDs 132, 134 or the display 136 to indicate that the universal input device 126 is ready for a new assignment. This may include lighting the LEDs 132, 134 to a first color, such as green, to indicate a ready status. Once the voice activation command is received by the controller 102 and the associated functionality is assigned to the universal input device 126, then the LEDs 132, 134 may change to a second color, such as blue, to indicate an in-use status. When in-use, the universal input device 126 is operable to transmit the universal input signal to the controller 102 to perform the assigned function.

Figure 6:
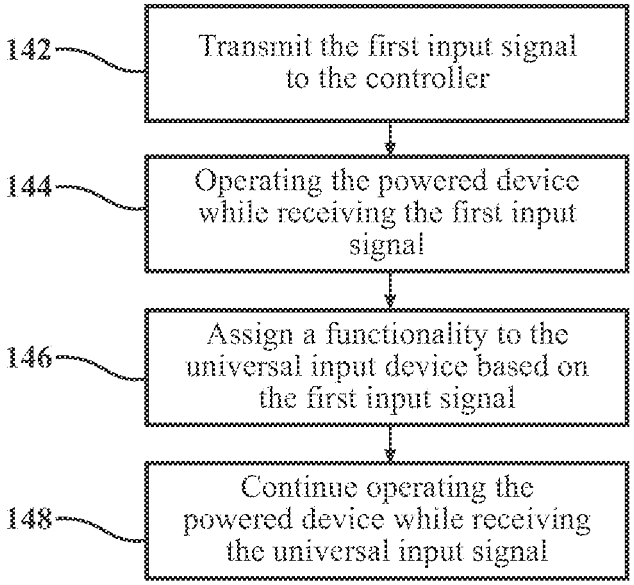
FIG. 6 is a flow chart illustrating steps of one method of assigning functionality to the universal input device.

FIG. 6 illustrates a method of operating one of the powered adjustment devices to perform a predetermined function on the patient support apparatus 30 using the user input device 110, the universal input device 126, and the controller 102. In step 142, the method comprises transmitting the first input signal from the user input device 110 to the controller 102. In step 144, the controller 102 operates the powered adjustment device 70-84 while receiving the first input signal from the user input device 110 to perform the predetermined function. In step 146, a functionality is assigned to the universal input device 126 based on the first input signal provided by the user input device 110 such that, after assigning the functionality to the universal input device 126, in step 148, the controller 102 is configured to continue operating the powered adjustment device 70-84 while receiving the universal input signal from the universal input device 126 to perform the predetermined function.

Figure 7A:
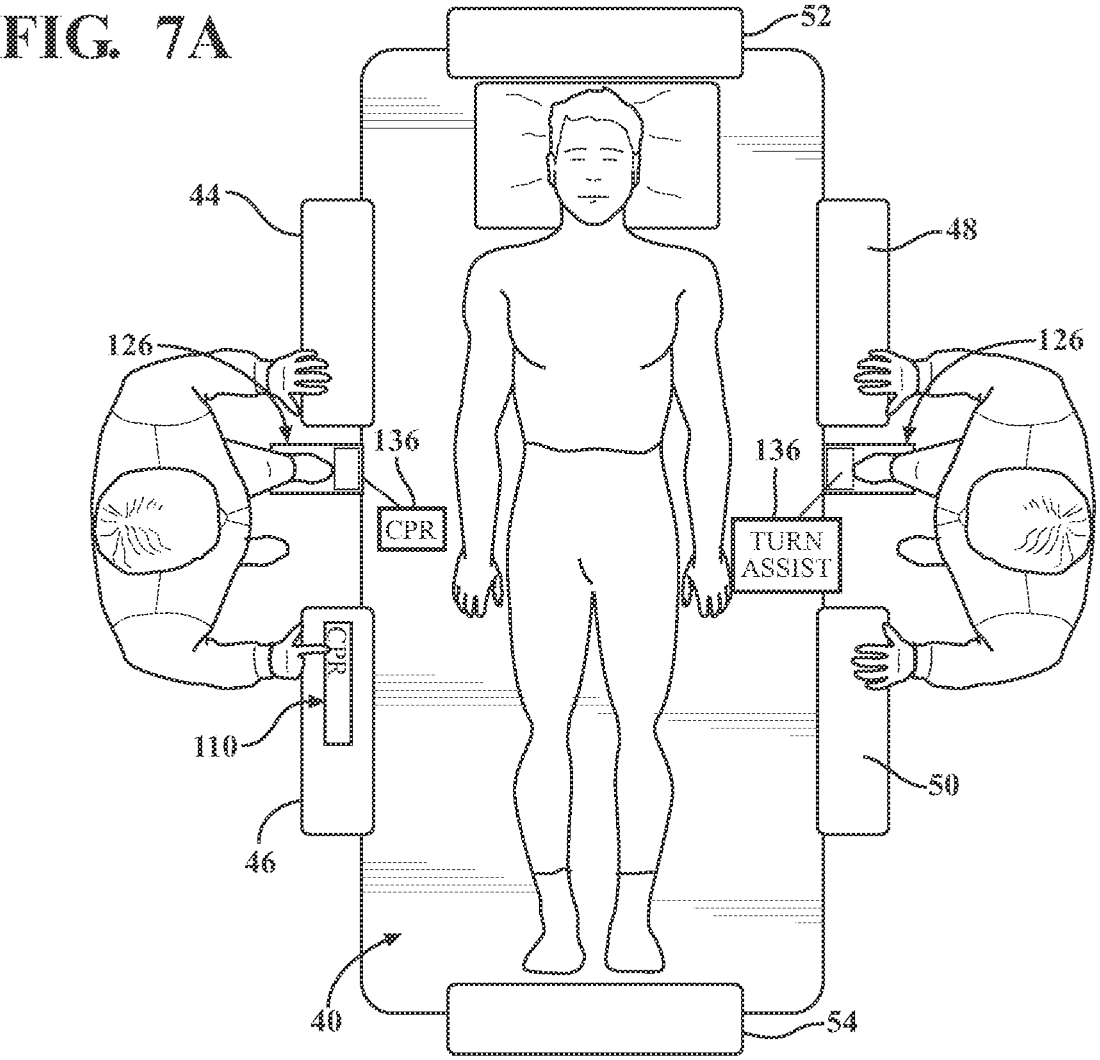
FIGS. 7A and 7B are illustrations showing different assignments of functionalities for universal input devices.

Referring to FIG. 7A, multiple universal input devices 126 may be employed. In some cases, the universal input devices 126 are positioned at different locations relative to the patient support apparatus 30. In some cases, the universal input devices 126 are dynamically assigned different functionalities based on predetermined events, patterns, or scenarios. For instance, if the caregiver indicates that CPR is needed, through actuation of the user input device 110, such as a CPR button or CPR lever, then the universal input device 126 on one side of the patient support apparatus 30 may be automatically assigned a CPR function by the controller 102, without requiring any actuation of the universal input device 126. The CPR function may be configured to simultaneously lower the patient support surface 42 via the lift device 78 and the fowler deck section via the deck adjustment device 84. The universal input device 126 on the opposite side of the patient support apparatus 30 may also be simultaneously and automatically assigned a turn assist functionality by the controller 102, e.g., to turn the patient via the patient turning device 74. As a result, a pair of caregivers may be able to quickly ready the patient for CPR and turn the patient simultaneously if needed.

Figure 7B:
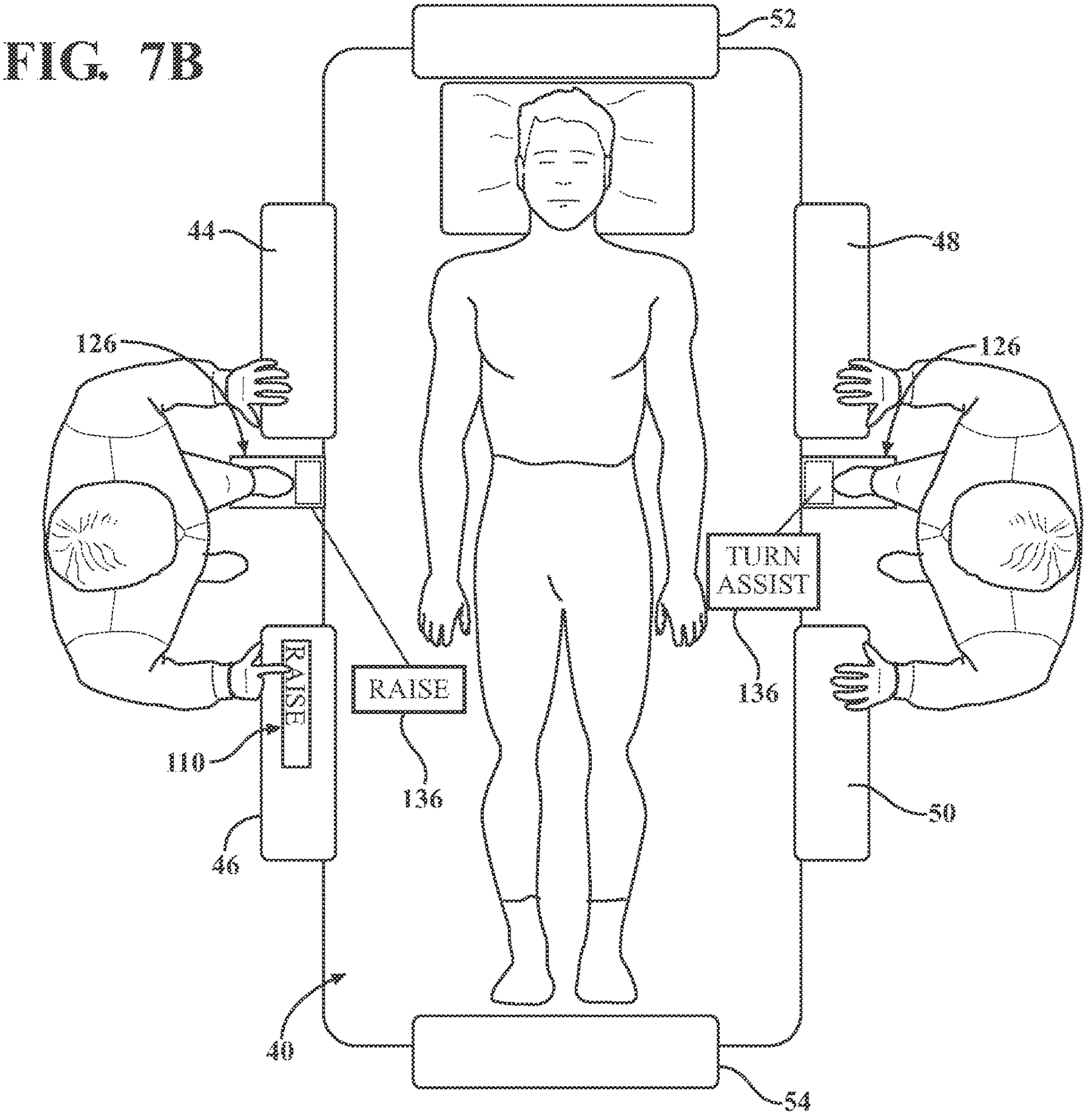

Other complementary functionality groupings are also possible. For instance, referring to FIG. 7B, the user input device 110 may comprise a RAISE button to raise the patient via the patient raising device 70 while the button is continuously actuated. In response to actuating the RAISE button, the controller 102 receives the associated first input signal from the RAISE button. If the universal input device 126 is actuated to generate the second input signal, either simultaneously with the first input signal, or within a predetermined time thereof, then the controller 102 assigns the nearest universal input device 126 the functionality associated with raising the patient via the patient raising device 70. At the same time, the controller 102 automatically assigns the other universal input device 126 a different functionality, such as the TURN ASSIST functionality associated with the patient turning device 74. This second assignment of the other universal input device 126 may occur automatically and without any actuation of the other universal input device 126. As a result, the patient support apparatus 30 is automatically configured to enable two caregivers to both raise the patient and turn the patient, either simultaneously or sequentially.

In some embodiments, the functionality of the universal input device 126 could be assigned by cycling through a series of functions illustrated on the display 136 of the universal input device 126. For instance, if the universal input device 126 is currently unassigned, an initial actuation and release of the universal input device 126 may cause a menu of potential functions to be displayed on the display 136. Subsequent actuations of the universal input device 126 may cycle through the different functions by highlighting the functions in sequence upon each actuation and release. Once a desired function is highlighted, the caregiver may simply actuate the universal input device 126 for a period of time greater than a threshold assignment period in order to assign the universal input device 126 the particular functionality that was highlighted.

In other embodiments, the first input signal used to assign the functionality of the universal input device 126 could be generated in response to the caregiver first manipulating a component of the patient support apparatus 30, such as the footboard 54. For instance, if the caregiver removes the footboard 54, an associated input signal is sent to the controller 102 (e.g., via a sensor such as a limit switch), then the controller 102 recognizes that the caregiver wishes to extend the bed and assigns the universal input device 126 the functionality associated with the bed length extension device 80 to allow the caregiver to extend the patient support apparatus 30 using the universal input device 126. Other automatic functionality assignments based on predetermined events are also contemplated. For instance, the universal input device 126 could be automatically assigned the functionality of lowering the lift device 78 if the controller 102 determines that the patient is attempting to exit the patient support apparatus 30.

As mentioned, the universal input device 126 may assume many forms, other than the foot pedal described above. For example, the universal input device 126 may comprise a side rail sensor 120 (see FIG. 1). The side rail sensor 120 may be actuated by another part of the caregiver's body, such as a leg or midsection, or by detecting the caregiver's presence. In this case, the caregiver merely needs to stand near, contact, lean against, or apply a force to the associated side rail 44, 46, 48, 50 to generate the universal input signal and continue operation of the powered adjustment device 70-84 to which it is assigned. For instance, the caregiver may energize the patient raising device 70 using the button B1, but after operation is initiated, the caregiver may cease actuating the button B1 and instead lean against one of the side rails 44, 46, 48, 50 to continue operation of the patient raising device 70, freeing the caregiver's hands to assist the patient in being repositioned. The side rail sensor 120 may comprise a force sensor, an optical sensor, an electromagnetic sensor, an accelerometer, a potentiometer, an infrared sensor, an ultrasonic sensor, or combinations thereof. Other sensors are also contemplated. The side rail sensor 120 may be coupled to at least one of the side rails 44, 46, 48, 50 to sense a body part of the caregiver near, contacting, or pressing against the at least one of the side rails 44, 46, 48, 50. The side rail sensor 120 may comprise any sensor suitable to provide the universal input signal.

It should be appreciated that although the universal input devices 126 are described above for controlling the powered adjustment devices 70-84, such universal input devices 126 may also be employed to control one or more of the powered adjustment devices 70-84, the powered comfort devices 86-90, or any combination of the powered devices 70-90.

A sensing system 150 is in communication with the controller 102, as shown in FIG. 2. The sensing system 150 may be used by the controller 102 for various purposes. The sensing system 150 comprises one or more sensors S. The sensors S may comprise one or more force sensors (e.g., load cells), timers, temperature sensors, switches, heart monitors, acoustic sensors (e.g., a cough monitor), microphones, breathing monitors, optical sensors, electromagnetic sensors, motion sensors, accelerometers, potentiometers, infrared sensors, ultrasonic sensors, mechanical limit switches, membrane switches, and cameras. Other types of sensors are also contemplated. Some of the sensors S may monitor thresholds or discrete point movements. The sensors S can be located anywhere on the patient support apparatus 30 or remote from the patient support apparatus 30. For example, the sensors S may be located on or in the base 34, the intermediate frame 36, the patient support deck 38, the mattress 40, the side rails 44, 46, 48, 50, the headboard 52, the footboard 54, or other suitable locations as described further below.

In one embodiment, the sensing system 150 may be used to determine a current patient condition. Various current patient conditions can be determined and used to control operation of the powered devices 70-90. Such patient conditions can comprise current positions of the patient (e.g., the patient is slouched, the patient is off center, the patient is lying supine, the patient is getting ready to exit, the patient is sitting up, etc.). Patient conditions can also comprise physiological conditions (e.g., a patient's heart rate, respiration, temperature, blood pressure, the patient is sleeping, the patient is coughing, skin conditions of the patient, etc.). Patient conditions can also comprise standard patient characteristics (e.g., weight, width, height, pathology, race, etc.). Patient conditions can also comprise patient history (e.g., activity level, movement history, etc.). Patient conditions can be determined by the controller 102 using the sensing system 150 and/or by input from the caregiver, patient, or other person, or retrieved from an electronic medical record (EMR).

In some embodiments described further below, the sensing system 150 acts as a secondary input device used to provide a second input signal to the controller 102 to cause or continue operation of the powered devices 70-90. In some cases, the second input signal is a patient condition input signal. The controller 102 may respond to the second input signal to automatically continue operation of one of the powered devices 70-90 until the patient reaches a desired patient condition, as indicated by the second input signal. In these embodiments, operation of the powered devices 70-90 is enabled by the sensing system 150 to free the caregiver to use his/her hands to perform other tasks.

Data from the sensing system 150 can be stored in the memory 116 of the controller 102 and can be used to provide a history log or charts for the caregiver, as well as activate alarms or other indicators to the caregiver if needed. For example, once the desired patient condition is reached (e.g. the patient is raised and no longer slouched), the sensing system 150 can continue to provide sensed data regarding the current patient condition to the controller 102. If the sensing system 150 determines that the patient is once again slouched or otherwise in a sub-optimal condition, the controller 102 can then activate an alarm or other indicator to notify the caregiver of the patient's sub-optimal condition.

The sensing system 150 may indicate when the predetermined function has been completed by the powered device 70-90. Further, the controller 102 may be configured to continue operating the powered device 70-90 until the predetermined function is complete. For example, the sensing system 150 may detect when the patient has been raised from a slouched position by a desired amount (e.g., six inches or eight inches) and the controller 102 may cease operation of the patient raising device 70 when this is sensed.

The sensing system 150 may also determine when the powered adjustment device can be stopped because a minimum or maximum position of the powered adjustment device 70-84 has been reached, such as by using a mechanical limit switch, a membrane switch, etc. For example, the lift device 78 may be configured to move between a minimum height at a fully-lowered position and a maximum height at a fully-lifted position. The lift device 78 may incorporate limit switches in its actuator (described below) to indicate when the minimum or maximum heights have been reached and cause the controller 102 to discontinue operation.

The sensing system 150 may also determine when the powered adjustment device can be stopped because a preset position of the patient or a preset position of one of the components of the patient support apparatus 30 has been reached. In some versions, the memory 116 stores the preset position. The controller 102 may be configured to continue operating one or more of the powered adjustment devices 70-84 until the preset position is reached, as determined by the sensing system 150.

A patient condition indicator 152, as shown in FIG. 1, may be in communication with the controller 102 to indicate the current patient condition to the caregiver. The controller 102 is configured to present information to the caregiver using the patient condition indicator 152 when the controller 102 determines that the current patient condition requires additional operation of one of the powered devices 70-90. The patient condition indicator 152 may comprise one or more of a display, a speaker, and a light emitting device. The patient condition indicator 152 shown in FIG. 1 is a display that presents graphical information to the caregiver regarding the current patient condition. The patient condition indicator 152 can make suggestions to the caregivers about additional operation of the powered device 70-90 or provide reminders to the caregivers. For instance, graphic or text messages may be presented to the caregiver that the patient needs additional raising because the patient has slid further down or the patient needs a temperature adjustment.

The powered devices 70-90 may have many possible configurations for performing the predetermined functions of the patient support apparatus 30. Exemplary configurations of some of the powered devices 70-90 are described further below, including the patient raising device 70, the patient centering device 72, the patient turning device 74, the patient ingress/egress device 76, the lift device 78, the bed length extension device 80, the bed width extension device 82, the deck adjustment device 84, the temperature device 86, the entertainment device 88, and the lighting device 90. It should be understood that numerous configurations of the powered devices 70-90, other than those specifically described, are possible. Additionally, numerous scenarios exist in which these powered devices 70-90 can be operated based on the first input signal and the second input signal. As previously described, the first input signal may be provided by one of the user input devices 110, while the second input signal may be provided by a secondary input device such as the universal input device 126 or the sensing system 150. A few exemplary scenarios of how these powered devices 70-90 may be utilized are also described below. However, numerous other scenarios not described herein, are also possible.

Figure 8:
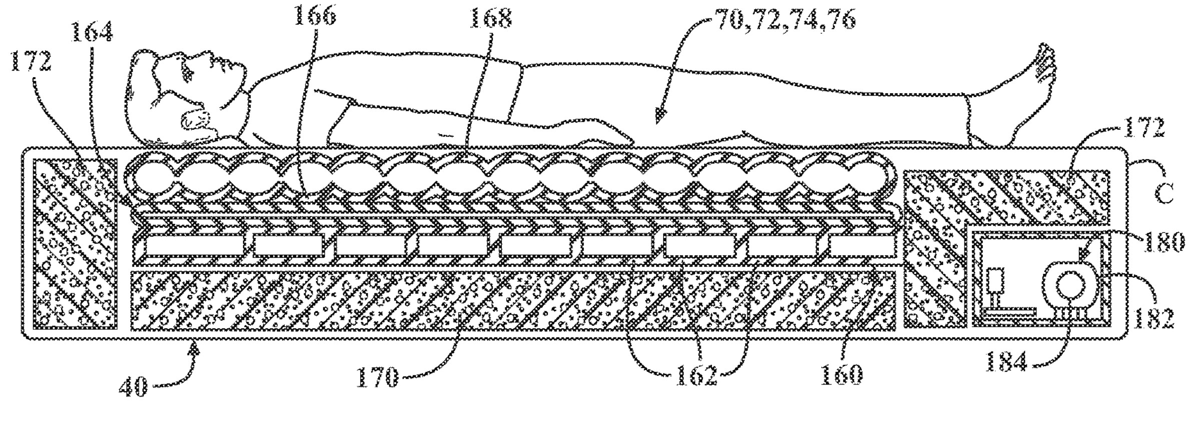
FIG. 8 is a cross-sectional view of a mattress taken longitudinally along the mattress to illustrate a pump and inflatable bladders.

Referring to FIGS. 8 and 9, the patient raising device 70, the patient centering device 72, the patient turning device 74, and the patient ingress/egress device 76 may be integrated into the mattress 40. In one embodiment, the mattress 40 is referred to as a self-contained therapy mattress since several working components of the mattress 40 that are used to carry out the functions of the patient raising device 70, the patient centering device 72, the patient turning device 74, and the patient ingress/egress device 76, are enclosed by a cover C of the mattress 40. The cover C can be any conventional material including, but not limited to natural fibers, polymeric materials, or combinations thereof. The cover C may be formed of a vapor permeable material. The cover C may be flexible and stretchable to accommodate inflation of various inflatable bladders described herein.

The patient raising device 70 is configured to perform the function of moving the patient from a slouched position towards a non-slouched position by moving the patient towards the head end of the patient support apparatus 30. The illustrated patient raising device 70 comprises a patient raising bladder structure 160 positioned within the cover C. The patient raising bladder structure 160 comprises patient raising inflation bladders 162 that are connected together longitudinally so that each of the patient raising inflation bladders 162 spans across a majority of a width of the mattress 40 below the patient and together, the patient raising inflation bladders 162 span a majority of a length of the mattress 40 below the patient.

In the embodiment shown, nine patient raising inflation bladders 162 assist in raising the patient from a slouched position. Additional patient raising inflation bladders 162 may be employed to raise the patient, or in some cases, fewer patient raising inflation bladders may be used. FIGS. 10A through 10C illustrate a progressive inflation scheme used to raise the patient six inches from the slouched position (see FIG. 10A). The patient raising inflation bladders 162 are inflated and deflated to create a wave-like force directed towards the head end of the patient support apparatus 30 to push the patient toward the head end. As shown, in some cases, only one of the patient raising inflation bladders 162 are fully inflated at a time to create the wave-like force needed to raise the patient. Once fully inflated, each patient raising inflation bladder 162 begins to deflate and the next adjacent patient raising inflation bladder 162 toward the head end begins to inflate (see, e.g., FIG. 10B).

The patient centering device 72 is configured to move the patient from an off-center position toward the longitudinal centerline CL of the mattress 40, such as when the patient has shifted too far to one side or the other of the mattress 40. Referring back to FIGS. 8 and 9, the patient centering device 72 comprises a patient centering/turning bladder structure 164 positioned within the cover C. The patient centering/turning bladder structure 164 comprises a pair of elongate bladders 166 that are connected together along a longitudinal seam so that each of the elongate bladders 166 spans a majority of the length of the mattress 40, but spans one half or less the width of the mattress 40, below the patient. The elongate bladders 166 are selectively inflated to guide the patient toward the longitudinal centerline CL of the mattress 40 when desired. Referring to FIGS. 11A and 11B inflation of one of the elongate bladders 166 is shown to urge the patient toward the centerline CL of the mattress 40. Movement of the patient toward the centerline CL may not be immediate, but may occur gradually as the elongate bladder 166 remains inflated.

Figure 12A:
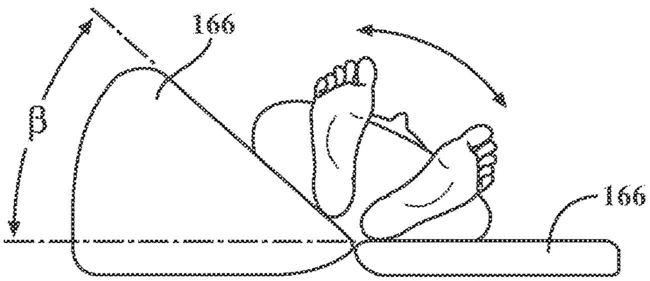
FIGS. 12A and 12B are illustrations of turning a patient.
Figure 12B:
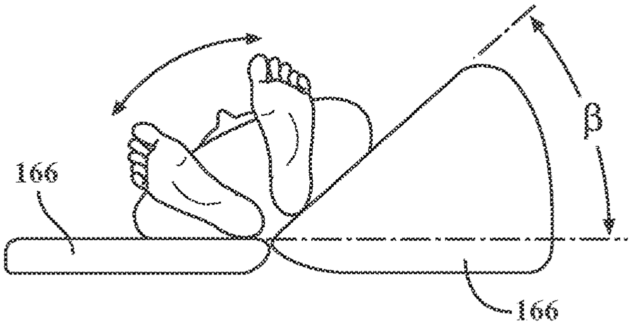

The patient turning device 74 is configured to perform the function of turning the patient and/or providing rotational therapy to the patient. The patient turning device 74 may utilize the same patient centering/turning bladder structure 164 as the patient centering device 72. When the patient turning device 74 is operated, the elongate bladders 166 are independently inflated to raise one side or the other of the patient. If used for rotation therapy, then the elongate bladders 166 are used for rotation therapy by sequentially inflating/deflating the elongate bladders 166 to raise one side of the patient to an angle (3, lower the patient, and then raise the other side of the patient to the angle (3 such that the patient experiences a side-to-side rotation that shifts pressures between the patient and the mattress 40. This motion is illustrated in FIGS. 12A and 12B.

The patient ingress/egress device 76 is configured to perform the function of easing ingress and/or egress of the patient to and/or from the patient support apparatus 30. Referring back to FIGS. 8 and 9, the patient ingress/egress device 76 comprises a main air bladder 168 positioned within the cover C. The main air bladder 168 is sized to extend substantially the full width of the mattress 40 and a majority of the length of the mattress 40. The main air bladder 168 comprises, in the embodiment shown, a single air bladder than can be inflated and deflated, depending on the needs of the patient or the caregiver. The main air bladder 168 may be fully inflated to ease ingress and egress of the patient. For instance, if the main air bladder 168 is less than fully inflated, e.g., to soften the mattress 40 and provide additional comfort to the patient, it can be difficult for the patient to move across the mattress 40 for ingress or egress. Accordingly, by fully inflating, and stiffening the mattress 40, movement across the mattress 40 can be made easier for the patient.

The patient raising bladder structure 160, the patient centering/turning bladder structure 164, and the main air bladder 168 are supported within the cover C of the mattress 40 by a base cushion 170. The base cushion 170 is located between outside lateral cushions 172 and outside longitudinal cushions 174. The cushions 170, 172, 174 may be rigid or flexible, may comprise one or more air bladders, or simply be constructed of conventional bedding materials such as foam, and the like. The cushions 170, 172, 174 may be separate cushions or may be integrated into an integral cushion structure.

A control unit 180 is shown at the foot end of the mattress 40 in FIG. 8. The control unit 180 comprises a rigid box that encloses a pump 182 and a motor 184 for operating the pump 182. As shown, the control unit 180 may fit within the cover C of the mattress 40 or outside of the cover C. The pump 182 is used to inflate the patient raising inflation bladders 162, the elongate bladders 166, and the main air bladder 168. Other configurations of the control unit 180 are also possible.

Figure 13:
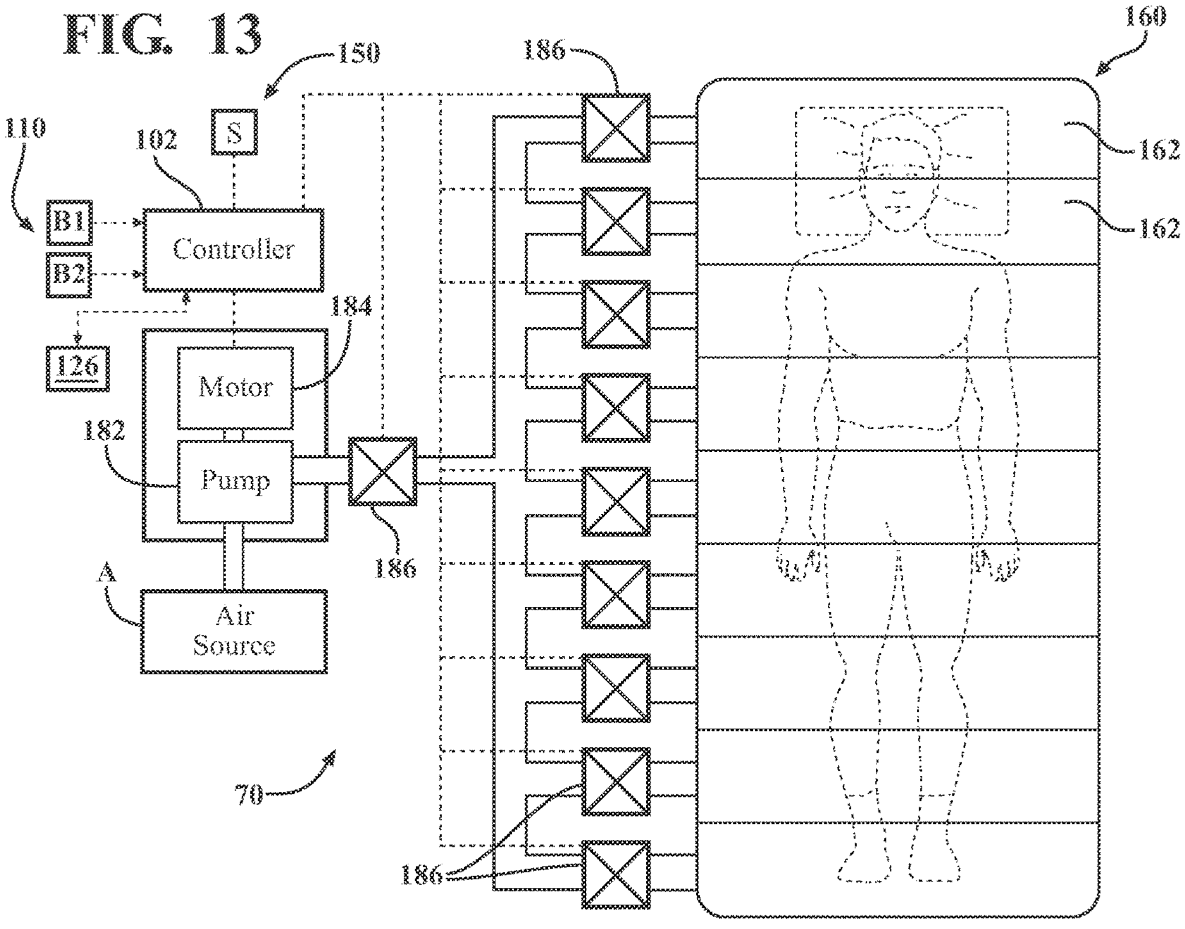
FIGS. 13, 14, and 15 are fluid and control schematics for a patient raising device, a patient centering/turning device, and a patient ingress/egress device.
Figure 14:
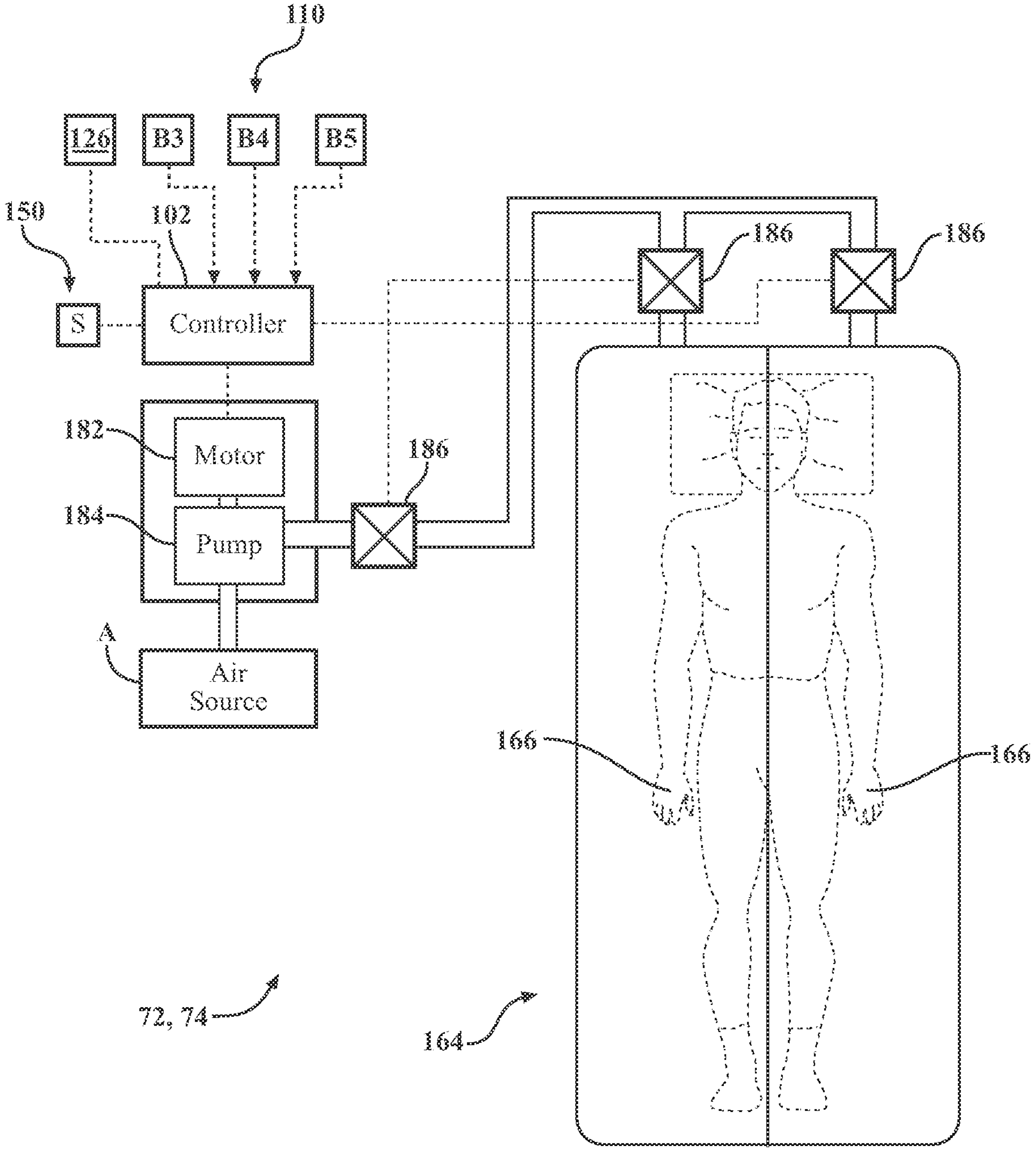
Figure 15:
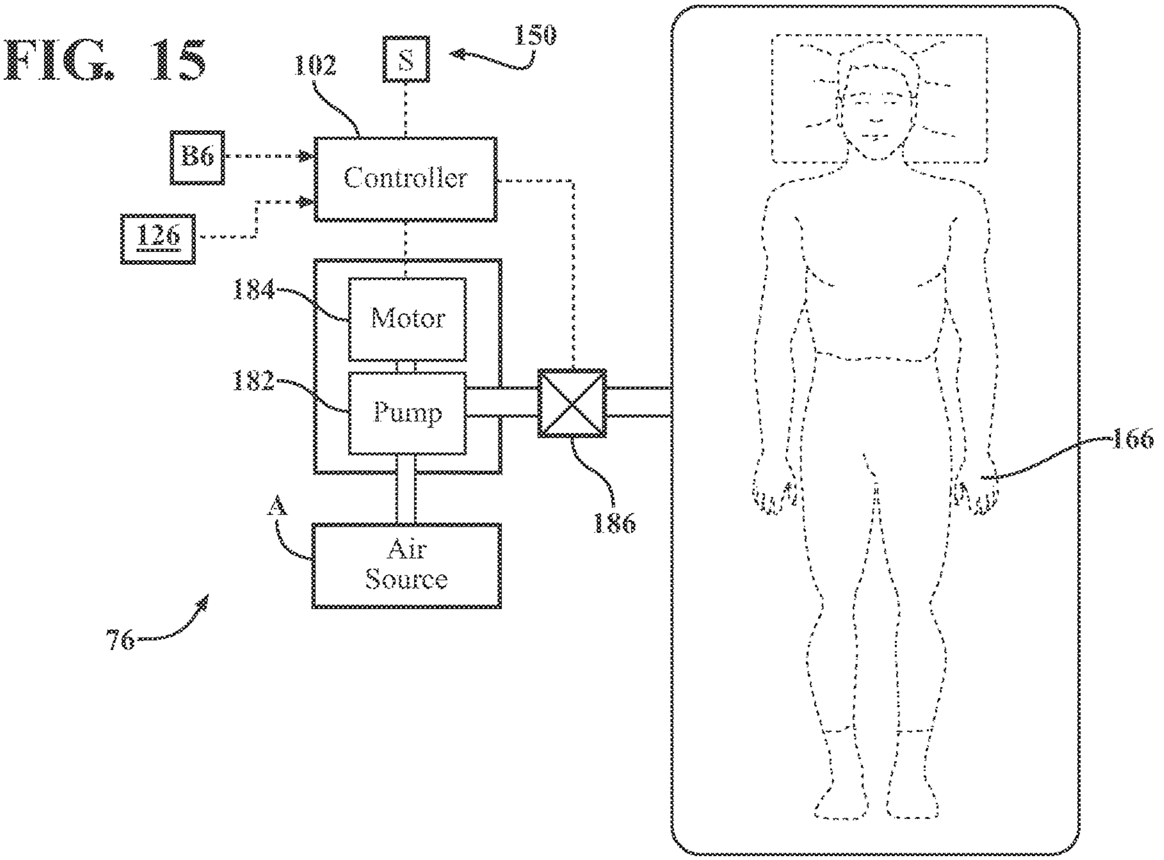

Referring to FIGS. 13-15, fluid flow schematics for the patient raising bladder structure 160, the patient centering/turning bladder structure 164, and the main air bladder 168, respectively, are shown. The fluid flow schematics generally illustrate the fluid flow paths in which fluid, such as air, flow from an air source (such as outside air) via the pump 182 to the patient raising bladder structure 160, the patient centering/turning bladder structure 164, and the main air bladder 168. Each of these schematics discloses valves 186, such as solenoid valves or other types of valves, that control the movement of the fluid into and out of the bladders 162, 166, 168 to perform the functions described herein. The valves 186 are controlled by the controller 102. The valves 186 may be 2-way, 3-way, or other configurations. The valves 186 may be able to selectively establish fluid communication between the pump 182 and each of the bladders 162, 166, 168 to inflate/deflate the bladders 162, 166, 168 or close off such fluid communication. The valves 186 may also be able to vent the bladders 162, 166, 168 to atmosphere to deflate the bladders 162, 166, 168.

In one exemplary operation of the patient raising device 70, the pump 182 sequentially inflates one or more of the patient raising inflation bladders 162, as shown in FIGS. 10A through 10C to move the patient from the slouched position to a raised position. The controller 102 is configured to initiate operation of the patient raising device 70 by actuating the pump 182 in response to receiving the first input signal from one of the user input devices 110, such as the buttons B1 or B2. The controller 102 is also configured to continue operating the patient raising device 70 based on receiving the universal input signal from the universal input device 126 or receiving the patient condition input signal from the sensing system 150.

When the patient condition input signal is provided by the sensing system 150, the current patient condition sensed by the sensing system 150 is the current position of the patient on the mattress 40 and the desired patient condition is a desired patient position, such as a raised position in which the patient is raised six inches. The sensing system 150 may comprise load cells disposed on or in the mattress 40. The load cells may be arranged so that the controller 102 is able to determine the current position of a center of gravity of the patient. Alternatively, the sensing system 150 may also comprise infrared sensors positioned on the headboard 52 and/or footboard 54 so that the controller 102 can determine a distance of the patient from the headboard 52 and/or footboard 54. Alternatively, an array of infrared sensors may be located to generate infrared light beams laterally across the mattress 40 near the foot end of the patient support apparatus 30 to determine a position of the patient based on the breaking of the infrared light beams. In further alternatives, the sensing system 150 may comprise cameras that are capable of determining the relative position of the patient to a predetermined reference location. Other sensor arrangements for determining the current position of the patient are contemplated, such as using accelerometers, potentiometers, or any other sensor that converts positional change to input signals. Once the current position of the patient is determined by the controller 102, the controller 102 then compares the current position of the patient to the desired patient position and continues operating the patient raising device 70 until the desired patient position has been reached. In the exemplary embodiment, this entails operating the pump 182 to sequentially inflate the patient raising inflation bladders 162 until the patient has reached the desired patient position. This may include operating the pump 182 until a current center of gravity of the patient is moved toward the head end of the patient support apparatus 30 by a desired distance.

During operation of the patient raising device 70, in another embodiment, the patient raising inflation bladder 162 that is located below a seat of the patient first inflates to elevate a top half of the patient. Simultaneously, or immediately following the inflation of the patient raising inflation bladder 162 located below the patient's seat, the patient raising inflation bladders 162 located below the lower body portion of the patient including the lower legs, thighs, and seat are then sequentially inflated to move the lower back of the patient towards the fowler section of the patient support deck 38. This combined movement moves the patient into the raised position.

By operating the patient raising device 70 based on the patient condition input signal from the sensing system 150, a longer duration of time in which raising occurs may be possible without requiring continuous actuation by the caregiver of the user input device 110 or the universal input device 126. This may also avoid disorienting effects on the patient from abrupt movement and reduce shear forces to the patient's skin. In some cases, operation of the patient raising device 70, including the time to inflate/deflate one sequence of the patient raising inflation bladders 162 may be twice as long as the time needed for the same operation if performed by continuously depressing the button B1 or B2, or using the universal input device 126.

Additionally, the controller 102 may determine a rate of adjustment for the patient raising device 70 based on other patient conditions. For example, skin condition may be used to control a speed at which the patient is raised by the patient raising device 70 since the patient's skin condition can determine how much shear force the patient can endure before feeling uncomfortable. In this case, the patient's skin condition can be manually input into the controller 102 using a user input device and based on skin condition rankings, e.g., from 1 to 10, and the controller 102 may be configured to adjust the speed based on the rankings. For instance, a ranking of 1 may cause the controller 102 to slow the speed by 50% from a normal speed. Additionally, skin conditions could be sensed by one or more sensors of the sensing system 150, such as infrared sensors, ultrasonic sensors, temperature sensors, and the like. For instance, skin thickness, temperature, sensitivity, or pathological conditions, could be skin parameters measured by these sensors and compared to a look-up table to determine the speed of adjustment.

In other embodiments, it is contemplated that the patient raising device 70 may comprise apparatuses described in U.S. provisional patent application No. 62/161,340, filed May 14, 2015, entitled, "Patient Repositioning Apparatus," which is hereby incorporated by reference in its entirety, to move the patient from the slouched position to the raised position.

In one exemplary operation of the patient centering device 72, the pump 182 operates to inflate one or more of the elongate bladders 166 to move the patient toward the centerline CL of the mattress 40. The controller 102 is configured to initiate operation of the patient centering device 72 by actuating the pump 182 in response to receiving the first input signal from one of the user input devices 110, such as button B3. The controller 102 is also configured to continue operating the patient centering device 72 based on receiving the universal input signal from the universal input device 126 or receiving the patient condition input signal from the sensing system 150.

When the patient condition input signal is provided by the sensing system 150, the current patient condition sensed by the sensing system 150 is the current position of the patient on the mattress 40 and the desired patient condition is a desired patient position, such as a centered position. The sensing system 150 may comprise load cells disposed on or in the mattress 40. The load cells may be arranged so that the controller 102 is able to determine the position of a center of gravity of the patient. The sensing system 150 may also comprise infrared sensors positioned on one or more of the side rails 44, 46, 48, 50 so that the controller 102 can determine a distance of the patient from the side rails 44, 46, 48, 50, and thus determine how close to the centerline CL the patient is located. Other sensor arrangements for determining the current position of the patient are contemplated. For example, cameras may be utilized to determine the current position of the patient relative to a predetermined reference location. Once the current position of the patient is determined by the controller 102, the controller 102 then compares the current position of the patient to the desired patient position and continues operating the pump 182 to further inflate the elongate bladders 166, or keep the elongate bladders 166 at a predetermined inflation pressure or angle, until the patient has reached the desired patient position.

During operation of the patient centering device 72, in one embodiment, the elongate bladder 166 that is located on the side of the mattress 40 on which the patient is sensed is first inflated. The elongate bladder 166 may be inflated at a moderate angle such that the patient slowly slides towards the centered position on the centerline CL. In some cases, both of the elongate bladders 166 may be inflated simultaneously, to different levels (e.g., different pressures or angles as measured by pressure sensors or angle sensors in communication with the controller 102) or the same level to keep the patient in the centered position. In other embodiments, not shown, three or more elongate bladders 166 may be provided and sequentially inflated in a similar manner as the patient raising inflation bladders 162 to create a wave-like force to move the patient towards the centered position.

In one exemplary operation of the patient turning device 74, the pump 182 may inflate one or more of the elongate bladders 166 to turn the patient. The controller 102 is configured to initiate operation of the patient turning device 74 by actuating the pump 182 in response to receiving the first input signal from one of the user input devices 110, such as buttons B4 or B5. The controller 102 is also configured to continue operating the patient turning device 74 based on receiving the universal input signal from the universal input device 126 or receiving the patient condition input signal from the sensing system 150.

When the patient condition input signal is provided by the sensing system 150, the current patient condition sensed by the sensing system 150 is the current position of the patient on the mattress 40 and the desired patient condition is a desired patient position, such as a turned position. The sensing system 150 may comprises load cells disposed on or in the mattress 40. The load cells may be arranged so that the controller 102 is able to determine if the patient is turned, or to the extent that the patient is turned, such as partially turned (e.g., based on load distribution on the load cells or changes in load distribution). The sensing system 150 may also comprise a camera positioned on one or more of the side rails 44, 46, 48, 50, the headboard 52, and/or the footboard 54 so that the controller 102 can determine if the patient is turned. Other sensor arrangements for determining the current position of the patient are contemplated. For instance, accelerometers, potentiometers, or other sensors of the sensing system 150 may be attached to the mattress 40 or the elongate bladders 166 to determine the extent that one side or the other of the mattress 40 has been adjusted to an angled position (e.g., relative to horizontal) indicating the extent that the patient is turned.

In some embodiments, three-axis accelerometers are fixed in a top layer of each of the elongate bladders 166, e.g., the layer closest to the patient. The accelerometers move and rotate (relative to gravity vector) as the elongate bladders 166 are inflated. The amount of rotation of the accelerometers is proportional to the angle of inflation of the elongate bladders 166 (see FIGS. 12A and 12B). These accelerometers, based on the amount of their movement relative to gravity (e.g., rotation) can be used by the controller 102 to determine the amount the patient has been turned.

Once the current position of the patient is determined by the controller 102, the controller 102 then compares the current position of the patient to the desired patient position and continues operating the patient turning device until the patient has reached the desired patient position. For example, in the illustrated embodiment, the controller operates the pump 182 to further inflate the elongate bladders 166, or keep the elongate bladders 166 at a predetermined inflation pressure or angle, until the patient has reached the desired patient position. In some cases, the angle of the patient is gradually increased until the turned position is reached. In one embodiment, once the turned position is reached, the sensing system 150 continues sensing the current position of the patient to determine that the patient has remained in the turned position for a desired period of time.

In one embodiment, actuation of the buttons B4 or B5, in addition to initiating operation of the patient turning device 74, may activate a timer. The timer is in communication with the controller 102 to indicate predetermined time intervals to the controller 102. These predetermined time intervals may indicate to the controller 102 when the patient needs to be turned in later turning cycles. In this example, the patient may be turned at each of the predetermined time intervals without the caregiver having to return to the patient every time the patient needs to be turned. As a result, the patient turning device 74 may be used to prevent bedsores or other ailments to the patient. In this embodiment, the sensing system 150 continues to sense the current position of the patient in order to determine whether the patient is in an appropriate position to begin another turning cycle, or to determine whether a patient turning cycle is complete. If the sensing system 150 determines that the patient is not in an appropriate position, e.g., the patient has exited the patient support apparatus 30, then the patient turning device 74 is disabled for the next cycle, but may resume when the patient is sensed to be back on the mattress 40. Simultaneously, the indicator system 130, or other alerting system, may locally or remotely indicate that the patient has exited the patient support apparatus 30.

In one exemplary operation of the patient ingress/egress device 76, the pump 182 may inflate the main air bladder 168 to assist the ingress or egress of the patient from the patient support apparatus 30. The controller 102 is configured to initiate operation of the patient ingress/egress device 76 by actuating the pump 182 in response to receiving the first input signal from one of the user input devices 110, such as button B6. The controller 102 is also configured to continue operating the patient ingress/egress device 76 based on receiving the universal input signal from the universal input device 126 or receiving the patient condition input signal from the sensing system 150.

When the patient condition input signal is provided by the sensing system 150, the current patient condition sensed by the sensing system 150 is the current position of the patient on the mattress 40 and the desired patient condition is a desired patient position, such as an egress position (e.g. a position of the patient on one side of the mattress 40). The sensing system 150 may comprise load cells disposed on or in the mattress 40. The load cells may be arranged so that the controller 102 is able to determine the position of a center of gravity of the patient. The sensing system 150 may also comprise a camera positioned on the headboard 52 and/or footboard 54 so that the controller 102 can determine the current position of the patient. Other sensor arrangements for determining the current position of the patient are contemplated. Once the current position of the patient is determined by the controller 102, the controller 102 then compares the current position of the patient to the desired patient position and continues operating the patient ingress/egress device 76 until the patient has reached the desired patient position. In the exemplary embodiment, the controller 102 may compare the current position of the patient to the desired patient position, and operate the pump 182 to further inflate the main air bladder 168, or keep the main air bladder 168 at a predetermined inflation pressure, until the patient has reached the desired patient position.

During operation of the patient ingress/egress device 76, the sensing system 150 may also provide data to the controller 102 so that the controller 102 can determine whether any of the side rails 44, 46, 48, 50 are currently in the raised position. If so, the controller 102 may indicate to the caregiver via the patient condition indicator 152 to lower at least one of the side rails 44, 46, 48, 50 for easier egress. Alternatively, the controller 102 may also automatically raise the fowler section of the patient support deck 38 so the patient is in a seated position to further assist egress.

In other embodiments, one or more of the elongate bladders 166 may be inflated to further assist in patient egress by urging the patient toward the egress position. The sensing system 150 may comprise a camera or other sensors located near the floor which provide data to the controller 102 to determine if the patient's feet are flat on the floor, which may indicate that the patient is in the egress position. If the patient is still in a non-egress position, the main air bladder 168 continues to be inflated until reaching a maximum inflation pressure in order to fully assist the patient egress. Once the sensing system 150 no longer senses the patient on the mattress 40, the controller 102 may deflate the main air bladder 168 as this may indicate that egress position has been reached. It is also contemplated that the main air bladder 168 may remain inflated to assist the patient with eventual ingress.

In still other embodiments, the sensing system 150 can determine whether the patient desires to enter the patient support apparatus 30. The sensing system 150 may determine that the patient is adjacent to the mattress 40, and the button B6 associated with the patient ingress/egress device 76 may be pressed by the caregiver or the patient. The sensing system 150 can determine a desired inflation pressure for the main air bladder 168 and inflate the main air bladder 168 until the patient is in the desired position.

Figure 16:
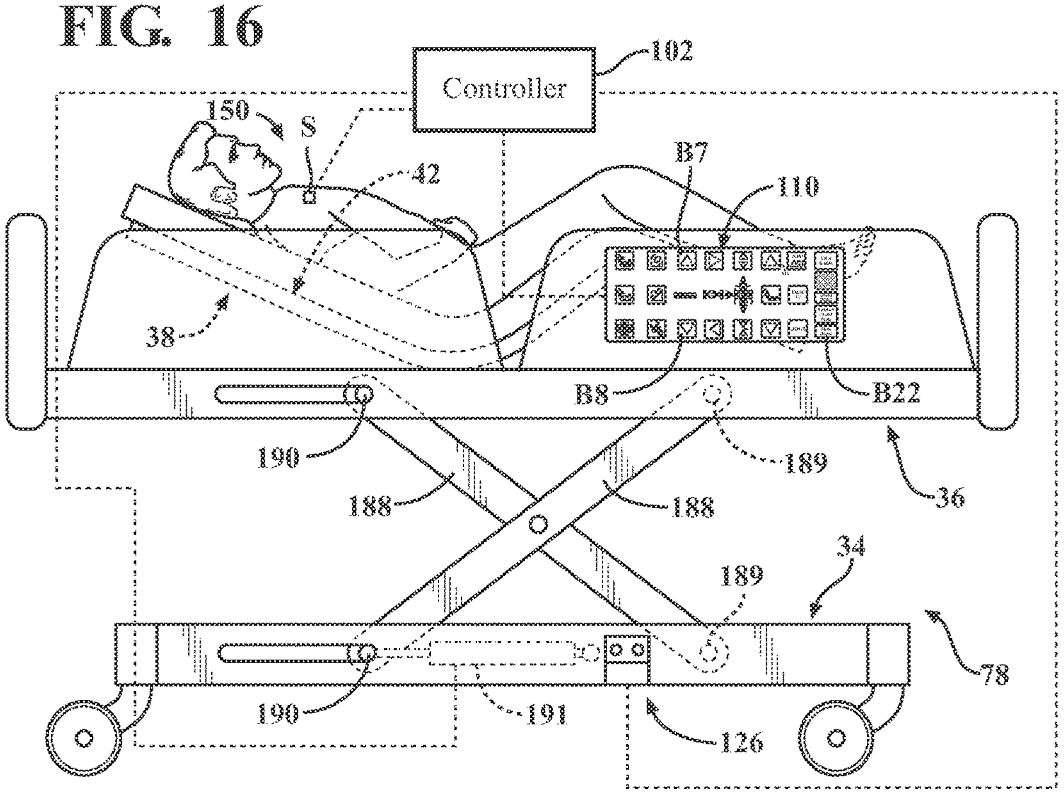
FIG. 16 is an elevational view of a lift device.

The lift device 78 is configured to lift and lower the patient between the minimum and maximum heights of the patient support apparatus 30, and intermediate positions therebetween. Referring to FIG. 16, in the exemplary embodiment, the lift device 78 comprises a pair of lift arms 188 pivotally connected at a center thereof and arranged in a scissor-lift configuration. The lift arms 188 are movable to raise and lower the patient support surface 42 relative to the base 34 and the floor surface. Each of the lift arms 188 have a first end pivotally connected at a fixed pivot point 189 to one of the base 34 and the intermediate frame 36. The lift arms 188 extend from the first end to a second end. A pin 190 is fixed to the second end and arranged to slide in a horizontal guide slot defined in one of the base 34 and the intermediate frame 36.

Figure 19:
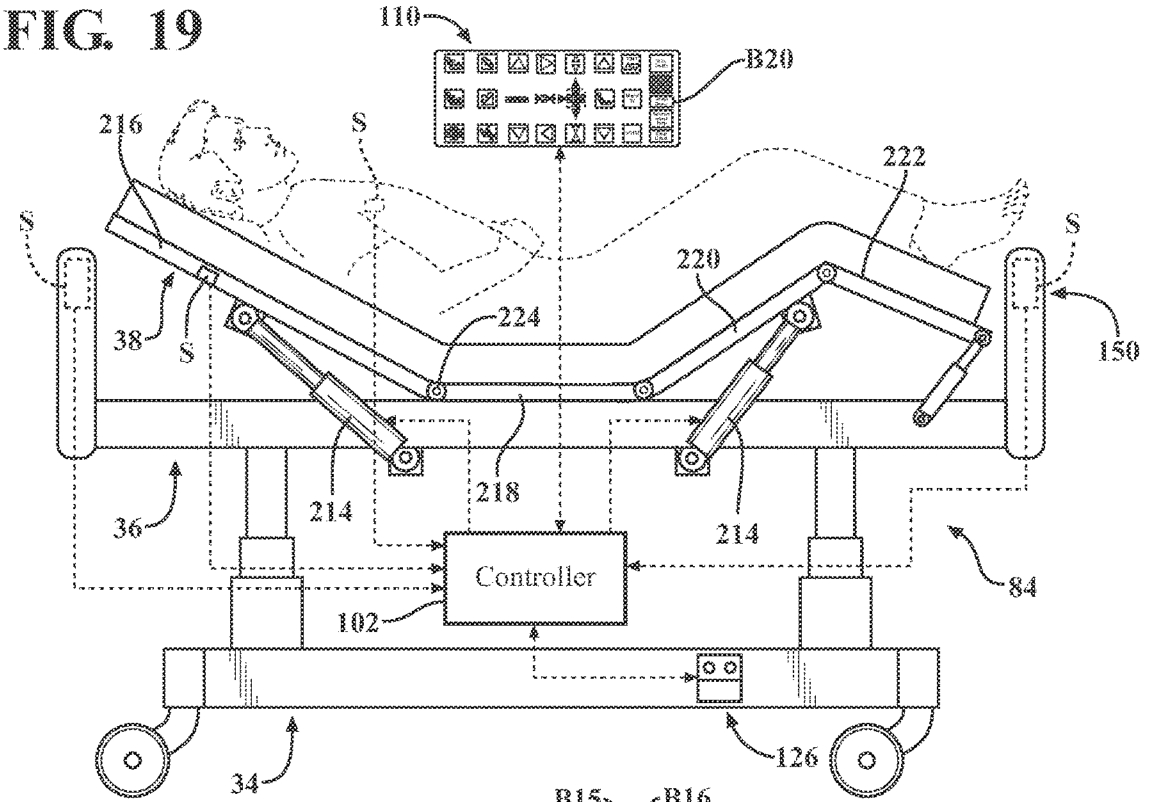
FIG. 19 is an elevational view of deck adjustment device.

An actuator 191 is fixed at one end to the base 34 and to one of the pins 190 at the other end. When actuated, the actuator 191 directly slides the pin 190 in the horizontal guide slot, which also indirectly slides the other pin 190 in the other horizontal guide slot, to raise and lower the patient support surface 42. The actuator 191 may comprise an electric linear actuator, a hydraulic cylinder, or similar driving mechanism. Suitable electric linear actuators are supplied by LINAK A/S located at Smedevænget 8, Guderup, DK-6430, Nordborg, Denmark. Other configurations of the lift device 78 are also possible, such as column lift mechanisms or linkage lift mechanisms as shown in FIGS. 1 and 19.

In some embodiments, the controller 102 is configured to initiate operation of the lift device 78 in response to receiving the first input signal when the caregiver presses the button B7 or B8 to operate the actuator 191 to either lift or lower the patient support surface 42. The controller 102 is also configured to continue operation of the lift device 78 based on receiving the universal input signal from the universal input device 126.

In further embodiments, operation of the lift device 78 is dependent on a triggering event that causes the controller 102 to operate the lift device 78 to move the patient from a current patient condition (e.g., a current patient elevation) to a desired patient condition (e.g., a desired patient elevation). In one embodiment, the triggering event occurs when the controller 102 detects that the patient is asleep. The controller 102 detects that the patient is asleep by receiving a triggering event input signal from the sensing system 150. The sensing system 150 may employ a heart rate sensor, an acoustic sensor, a camera, or other suitable sensor to generate the triggering event input signal. The triggering event input signal may be generated when the heart rate sensor detects a heart rate of the patient that is indicative of the patient sleeping, the acoustic sensor detects signals indicative of snoring, the camera detects the patient being still for a predetermined period of time, and the like.

If the patient is determined to be awake, the controller 102 continues to monitor the sensing system 150 until it is determined that the patient is sleeping. Once the controller 102 determines that the patient is sleeping, the controller 102 then determines, based on other inputs signals from the sensing system 150, a current patient support configuration, e.g., a current height of the patient support apparatus 30. The current patient support configuration is associated with the current patient condition, e.g., the current patient elevation. The controller 102 then compares the current patient support configuration to a desired patient support configuration, e.g., the patient support apparatus 30 being at a lowered position. The desired patient support configuration is associated with the desired patient condition, e.g., the desired patient elevation.

If the patient support apparatus 30 is not already at the lowered position, the controller 102 operates the actuator 191 to slowly lower the patient support apparatus 30 to the lowered position. By slowly lowering the patient support apparatus 30, such as at a speed much slower than during normal operation of the lift device 78 using the control panel CP, the patient is not awakened. The input signals used to determine the current patient support configuration may be from an encoder on the actuator 191, infrared sensors, ultrasonic sensors, or other suitable sensors of the sensing system 150 that are able to determine the current height of the patient support apparatus 30.

The lowered position of the patient support apparatus 30 may prevent injury if the patient accidently rolls or falls out of the patient support apparatus 30 during sleep. Thus, the desired patient elevation when the patient is asleep is when the patient support apparatus 30 is at the lowered position. In some cases, the lowered position is when the patient support apparatus is at the minimum height.

It is contemplated that if the sensing system 150 transmits data to the controller 102 indicating that that patient has awakened or is no longer sleeping during the lowering of the patient support apparatus 30 to the lowered position, the controller 102 is configured to stop lowering the patient support apparatus 30. The sensing system 150 continues sensing and when the data transmitted to the controller 102 indicates that the patient is once again sleeping, movement of the patient support apparatus 30 to the lowered position may resume.

In one exemplary operation of the lift device 78 using the sensing system 150, the first input signal is provided by the caregiver via a button B22 (see also FIG. 3) that initiates sleep detection. However, in this example, when the controller 102 receives the first input signal, the lift device 78 is not yet operated until the controller 102 determines that the patient is sleeping via the triggering event input signal from the sensing system 150. Once the controller 102 determines that the patient is sleeping based on the triggering event input signal, the controller 102 then determines a current patient support configuration based on additional input signals from the sensing system 150 to determine if the patient support apparatus 30 is already at the lowered position. If not, the actuator 191 is operated until the patient support apparatus 30 reaches the lowered position (which may be at the minimum height of the patient support apparatus 30), or until the patient awakens.

Figure 17:
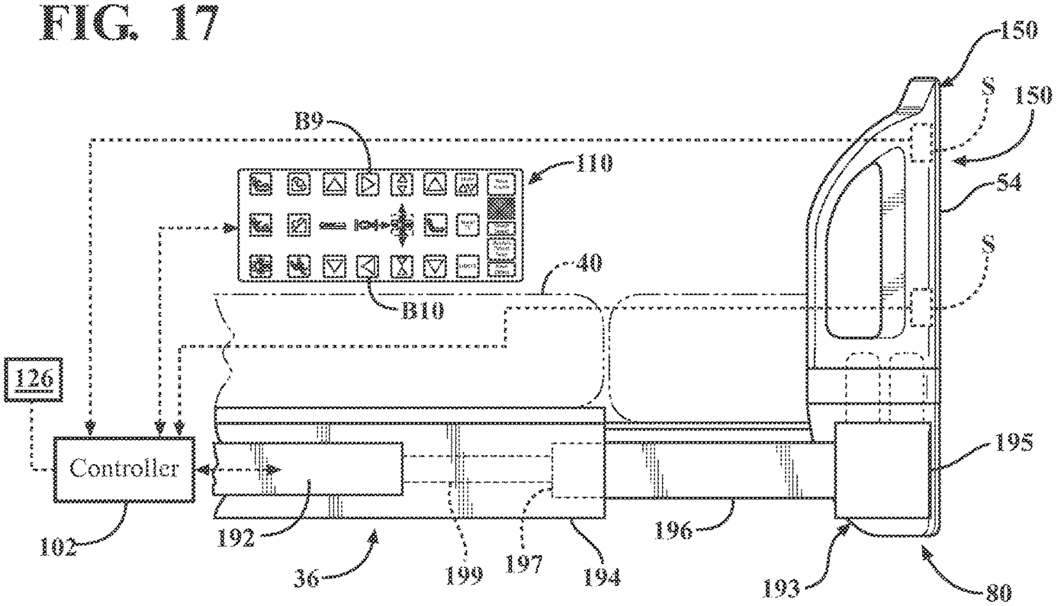
FIG. 17 is an elevational view of a bed length extension device.

The bed length extension device 80 is configured to perform the function of adjusting a length of the patient support apparatus 30 to accommodate patients of greater than average height. Referring to FIG. 17, in the exemplary embodiment, the bed length extension device 80 comprises a pair of actuators 192 (only one shown) to move a bed extension 193 between an unextended position and extended positions with respect to the intermediate frame 36. In some cases only one actuator is employed. In some embodiments, the bed extension 193 is movable from zero to at least twelve inches from the unextended position to a fully-extended position. In other embodiments, the bed extension 193 is able to move less or more than twelve inches and may be extendable to any position between the unextended and fully-extended position using the actuators 192. The bed extension 193 may have two, three, four, or nearly an infinite number of extended positions in which to be adjusted by the actuators 192.

The actuators 192 may comprise electric linear actuators. Suitable linear actuators are supplied by LINAK A/S located at Smedevænget 8, Guderup, DK-6430, Nordborg, Denmark. The bed extension 193 provides auxiliary support for the patient in the extended positions. In the version shown in FIG. 17, the bed extension 193 extends a foot end of the patient support apparatus 30 to accommodate patients of greater than average height. The footboard 54 is coupled to a carrier 195 of the bed extension 193. The footboard 54 moves with the bed extension 193 from the unextended position to the extended positions.

In the embodiment shown, the intermediate frame 36 comprises a pair of longitudinally oriented frame members 194 (only one shown). Legs 196 of the bed extension 193 are slidably and telescopically supported in the frame members 194. The legs 196 are attached to the carrier 195 of the bed extension 193. The legs 196 extend away from the carrier 195 to ends 197 disposed in the frame members 194. The ends 197 of the legs 196 are coupled to piston rods 199 of the actuators 192. The piston rods 199 are driven by the actuators 192 to extend and retract thereby pushing and pulling the legs 196 within the frame members 194 between the unextended and extended positions. Each of the frame members 194 have a hollow tubular shape with rectangular outer walls, e.g., rectangular tubing. In other embodiments, the frame members 194 may be cylindrical or other shapes or a single frame member may be employed. Various structures are contemplated to support the bed extension 193 during movement between the unextended position and the extended positions.

The controller 102 is configured to initiate operation of the bed length extension device 80 in response to receiving the first input signal by operating the actuators 192 to extend or retract the bed extension 193. The controller 102 continues operation of the bed length extension device 80 based on receiving the universal input signal from the universal input device 126 or receiving the patient condition input signal from the sensing system 150.

When the sensing system 150 is employed to provide the patient condition input signal, the patient condition being sensed may comprise patient height or a proximity of the patient to a footboard 54. In these embodiments, the first input signal, such as from the buttons B9 or B10, may start operation of the bed length extension device 80, but the patient condition input signal is used by the controller 102 to automatically continue operation of the bed length extension device 80 based on the height of the patient or the proximity of the patient to the footboard 54 as detected by the sensing system 150. The sensing system 150 may use any number of sensor arrangements to determine the height of the patient, or the proximity of the patient to the footboard 54, including a camera, infrared/ultrasonic sensors on the side rails 44, 46, 48, 50, headboard 52, and/or footboard 54, load cells, etc. For instance, ultrasonic sensors may be positioned on the footboard 54 to determine a distance of the patient's feet from the footboard 54, or load cells may be arranged below the mattress 40 and adjacent to the footboard 54 to determine if loads are present that are associated with taller patients.

Additional input signals from the sensing system 150 may be used by the controller 102 to determine a current patient support configuration, which, for example, may comprise a current length between the headboard 52 and the footboard 54 or a current extension position of the bed extension 193. The controller 102 is configured to compare the current patient support configuration, e.g., a current extension position of the bed extension 193, to a desired patient support configuration based on the patient condition (e.g., patient height) sensed by the sensing system 150. The desired patient support configuration may be stored in the memory 116 in a look-up table of desired bed extension positions based on patient height. The controller 102 then operates the actuators 192 accordingly until the desired patient support configuration is reached.

Figure 18:
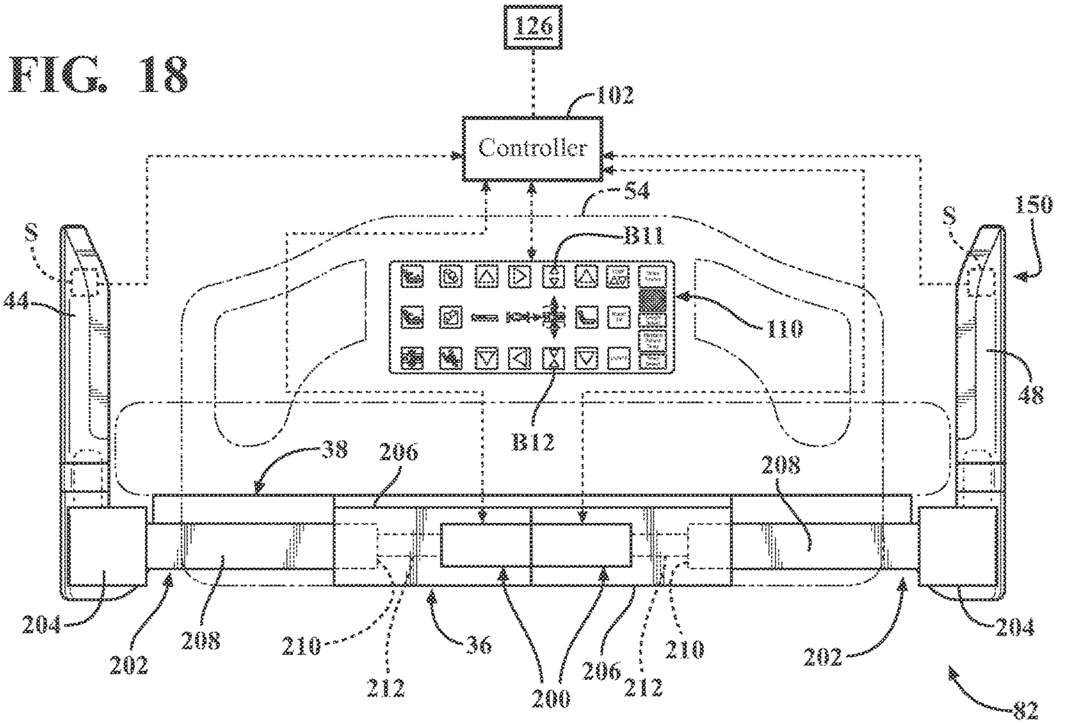
FIG. 18 is an elevational view of a bed width extension device.

The bed width extension device 82 is configured to perform a function of adjusting a width of the patient support apparatus 30 to accommodate patients of greater than average width. Referring to FIG. 18, the bed width extension device 82 may operate in the same manner as the bed length extension device 80. The bed width extension device 82 comprises two sets of actuators 200 (only one set shown) to move four bed extensions 202 (only two shown) between unextended and extended positions with respect to the intermediate frame 36. In some cases only one actuator or one set of actuators is employed. In some embodiments, each of the bed extensions 202 is movable from zero to at least twelve inches from the unextended position to a fully-extended position. In other embodiments, each of the bed extensions 202 is able to move less or more than twelve inches and may be extendable to any position between the unextended and the fully extended position using the actuators 200. Each of the bed extensions 202 may have two, three, four, or nearly an infinite number of extended positions in which to be adjusted by the actuators 200.

The actuators 200 may comprise electric linear actuators. Suitable linear actuators are supplied by LINAK A/S located at Smedevænget 8, Guderup, DK-6430, Nordborg, Denmark. The bed extensions 202 provides auxiliary support for the patient in the extended positions. In the version shown in FIG. 18, the bed extension 202 extends a width of the patient support apparatus 30 to accommodate patients of greater than average width. Each of the side rails 44, 46, 48, 50 is coupled to one of the carriers 204 of the bed extensions 202. The side rails 44, 46, 48, 50 move with the bed extensions 202.

In the embodiment shown, the intermediate frame 36 comprises two pairs of laterally oriented frame members 206 (only one pair shown). Legs 208 of the bed extensions 202 are slidably and telescopically supported in the frame members 206. The legs 208 are attached to the carriers 204 of the bed extensions 202. The legs 208 extend away from the carriers 204 to ends 210 disposed in the frame members 206. The ends 210 of the legs 208 are coupled to piston rods 212 of the actuators 200. The piston rods 212 are driven by the actuators 200 to extend and retract thereby pushing and pulling the legs 208 within the frame members 206 between the unextended and extended positions. Each of the frame members 206 have a hollow tubular shape with rectangular outer walls, e.g., rectangular tubing. In other embodiments, the frame members 206 may be cylindrical or other shapes or a single frame member may be employed. Various structures are contemplated to support the bed extension 202 during movement between the unextended position and the extended positions.

The controller 102 is configured to initiate operation of the bed width extension device 82 in response to receiving the first input signal by operating the actuators 200 to extend or retract the bed extensions 202. The controller 102 continues operation of the bed width extension device 82 based on receiving the universal input signal from the universal input device 126 or receiving the patient condition input signal from the sensing system 150.

When the sensing system 150 is employed to provide the patient condition input signal, the patient condition being sensed may comprise patient width or a proximity of the patient to the side rails 44, 46, 48, 50. In these embodiments, the first input signal, such as from buttons B11 or B12, may start operation of the bed width extension device 82, but the patient condition input signal is used by the controller 102 to automatically continue operation of the bed width extension device 82 based on the width of the patient or the proximity of the patient to the side rails 44, 46, 48, 50, as detected by the sensing system 150.

The sensing system 150 may use any number of sensor arrangements to determine the width of the patient, or the proximity of the patient to the side rails 44, 46, 48, 50, including a camera, infrared/ultrasonic sensors on the side rails 44, 46, 48, 50, headboard 52, and/or footboard 54, load cells, etc. For instance, ultrasonic sensors may be positioned on each of the side rails 44, 46, 48, 50 to determine a distance of the patient's torso from the side rails 44, 46, 48, 50 to thereby determine how much space the patient takes up between the side rails 44, 46, 48, 50, or load cells may be arranged below the mattress 40 and adjacent to the side rails 44, 46, 48, 50 to determine if loads are present that are associated with wider patients.

Additional input signals from the sensing system 150 may be used by the controller 102 to determine a current patient support configuration, which, for example, may comprise a current width between the side rails 44, 46, 48, 50 or current extension positions of the bed extensions 202. The controller 102 is configured to compare the current patient support configuration, e.g., a current extension position of the bed extensions 202, to a desired patient support configuration based on the patient condition (e.g., patient width) sensed by the sensing system 150. The desired patient support configuration may be stored in the memory 116 in a look-up table of desired bed extension positions based on patient width. The controller 102 then operates the actuators 200 accordingly until the desired patient support configuration is reached.

The deck adjustment device 84 is configured to articulate one or more of the deck sections of the patient support apparatus 30. Referring to FIG. 19, in the exemplary embodiment, the deck adjustment device 84 comprises one or more deck actuators 214 to move one or more of the deck sections of the patient support apparatus 30 including but not limited to the fowler section 216, the seat section 218, the thigh section 220, and the foot section 222. The actuators 214 may comprise electric linear actuators extending between the intermediate frame 36 and the particular deck section being adjusted. For example, as shown in FIG. 19, the fowler section 216 is pivotally connected to the intermediate frame 36 at a fixed pivot 224. One of the deck actuators 214 has a first end pivotally connected to the intermediate frame 36 and a second end pivotally connected to the fowler section 216. Actuation of this deck actuator 214 raises and lowers the fowler section 216 at various inclination angles relative to the intermediate frame 36. Suitable linear actuators are supplied by LINAK A/S located at Smedevænget 8, Guderup, DK-6430, Nordborg, Denmark. It is contemplated that any suitable deck adjustment system may be utilized in conjunction with the patient support apparatus 30, so long as the deck adjustment is configured to move one or more of the deck sections.

In some embodiments, the controller 102 is configured to initiate operation of the deck adjustment device 84 in response to receiving the first input signal by operating the deck actuator 214 based on the first input signal. The controller 102 is also configured to continue operating the deck adjustment device 84 based on receiving the universal input signal from the universal input device 126.

In further embodiments, operation of the deck adjustment device 84 is dependent on a triggering event that causes the controller 102 to operate the deck adjustment device 84 to move the patient from a current patient condition (e.g., a current patient posture) to a desired patient condition (e.g., a desired patient posture). In one embodiment, the triggering event occurs when the controller 102 detects that the patient is having a coughing episode, such as repeatedly coughing a predetermined number of times over a predetermined period of time. The controller 102 detects that the patient is having the coughing episode by receiving triggering event input signals from the sensing system 150. The sensing system 150 may employ load cells, an acoustic sensor such as a microphone, or other suitable sensor of the sensing system 150 to generate the triggering event input signals. The triggering event input signals may be generated by the load cells being positioned below the mattress 40 and experiencing periodic spikes or disturbances in their measurements associated with coughing. The triggering event input signals may also be generated by the microphone when the microphone senses coughing or other noises made by the patient.

If the patient is determined not to be having a coughing episode, the controller 102 continues to monitor the sensing system 150 until it is determined that the patient is having a coughing episode. Once the controller 102 determines that the patient is having a coughing episode, the controller 102 then determines, based on other input signals from the sensing system 150, a current patient support configuration, e.g., a current inclination angle of the fowler section 216. The current patient support configuration is associated with the current patient condition, e.g., the current patient posture. The controller 102 then compares the current patient support configuration to a desired patient support configuration, e.g., the inclination angle being at 45 degrees. The desired patient support configuration is associated with the desired patient posture. The desired patient support configuration is based on a configuration that causes the patient to move to a posture to decrease coughing, e.g., sitting the patient up. This is accomplished, in one embodiment, by articulating the fowler section 216 to the desired inclination angle. If the fowler section 216 is not already at the desired inclination angle, the controller 102 operates the actuator 214 to slowly raise the fowler section 216 to the desired inclination angle. The input signals used to determine the current patient support configuration may be from an encoder on the actuator 214, infrared sensors, ultrasonic sensors, or other suitable sensors of the sensing system 150 that are able to determine the current inclination angle of the fowler section 216.

In one exemplary operation of the deck adjustment device 84, the first input signal is provided by the caregiver via a button B20 that initiates cough detection. However, in this example, when the controller 102 receives the first input signal, the deck adjustment device 84 is not yet operated until the controller 102 determines that the patient is having a coughing episode, via the triggering event input signals from the sensing system 150. Once the controller 102 determines that the patient is having a coughing episode based on the triggering event input signals, the controller 102 then determines a current patient support configuration based on additional input signals from the sensing system 150 to determine if the inclination angle of the fowler section 216 is already at 45 degrees (or other desired inclination angle). If not, the actuator 214 is operated until the inclination angle reaches 45 degrees, or until the patient ceases having the coughing episode.

The temperature device 86 is configured to adjust the temperature of the patient, the temperature of patient support apparatus 30, and/or the temperature of the room in which the patient resides for purposes of patient comfort, therapy, or recovery. The temperature may be adjusted up or down using buttons B15 or B16.

Figure 20:
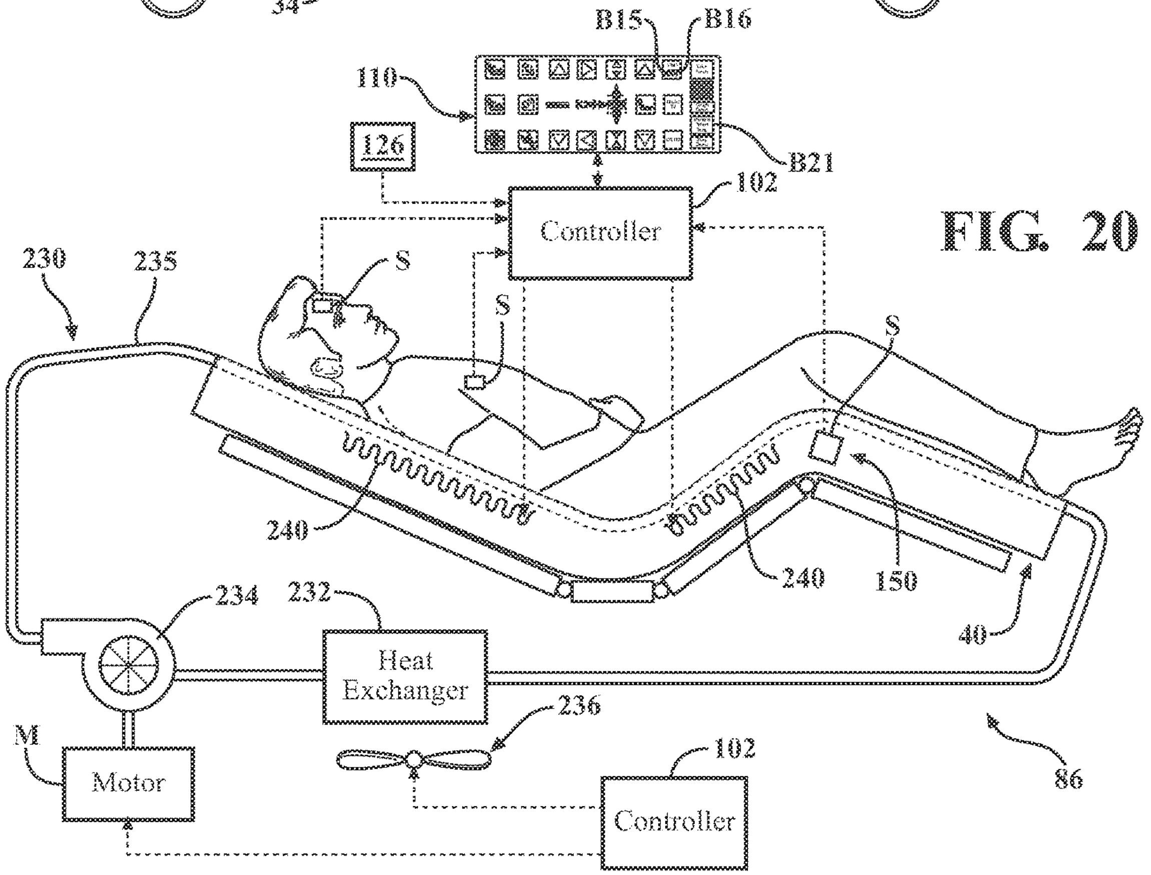
FIG. 20 is an illustration of a temperature device.

The exemplary temperature device 86 shown in FIG. 20 comprises a cooling fluid circuit 230 integrated into the mattress 40. The cooling fluid circuit 230 comprises a heat exchanger 232 and a pump 234 operated by a motor M. Tubing 235 located in the mattress 40 below the patient conveys fluid, such as water or coolant, which carries heat away from the patient. A blower/fan 236 then removes the heat from the fluid as the fluid moves through the heat exchanger 232 to cool the fluid in the fluid circuit 230. The temperature device 86 may also comprise heating elements 240 integrated into the mattress 40 to heat the patient. The motor M and the heating elements 240 are in communication with the controller 102 to be controlled by the controller 102.

In some embodiments, the sensing system 150 comprises at least one temperature sensor S to provide the patient condition input signal. A single temperature sensor S may be employed or multiple temperature sensors S may be employed to sense the temperature of the patient at various individual points on the patient's body including but not limited to the patient's head, neck, shoulders, hands, arms, upper back, lower back, hips, rear, thighs, lower legs, and feet, or to sense the temperature adjacent to the patient (see, e.g., temperature sensor S in the mattress 40). The sensed temperature at one or more points is transmitted to the controller 102 which determines a current patient condition (e.g., a current temperature) based on the sensed temperature. The controller 102 then compares the current patient condition to a desired patient condition (e.g., a desired patient temperature).

In one exemplary operation of the temperature device 86, the first input signal is provided by the caregiver via a button B21, which is actuated to maintain the patient temperature at a normal temperature, e.g., 98.6 degrees. The sensing system 150 is then configured to provide the sensed data (e.g., the patient's internal temperature) to the controller 102 which determines the current patient condition, e.g., the current patient temperature. The controller 102 compares the current patient condition to the desired patient condition, e.g., the desired patient temperature. If the controller 102 determines that the current patient condition is not the same as the desired patient condition, the controller 102 continues actuating the pump 234 to move fluid within the cooling fluid circuit 230 or activates the heating elements 240 until the current patient condition matches the desired patient condition.

In other embodiments, the temperature device 86 may comprise a blower to circulate air under beneath the patient to cool the patient in the event the patient's current temperature exceeds the desired patient temperature. In further embodiments, the sensing system 150 may be able to detect localized hotspots, such as with an infrared camera, and provide localized cooling to those hotspots to meet the desired patient condition.

Figure 21:
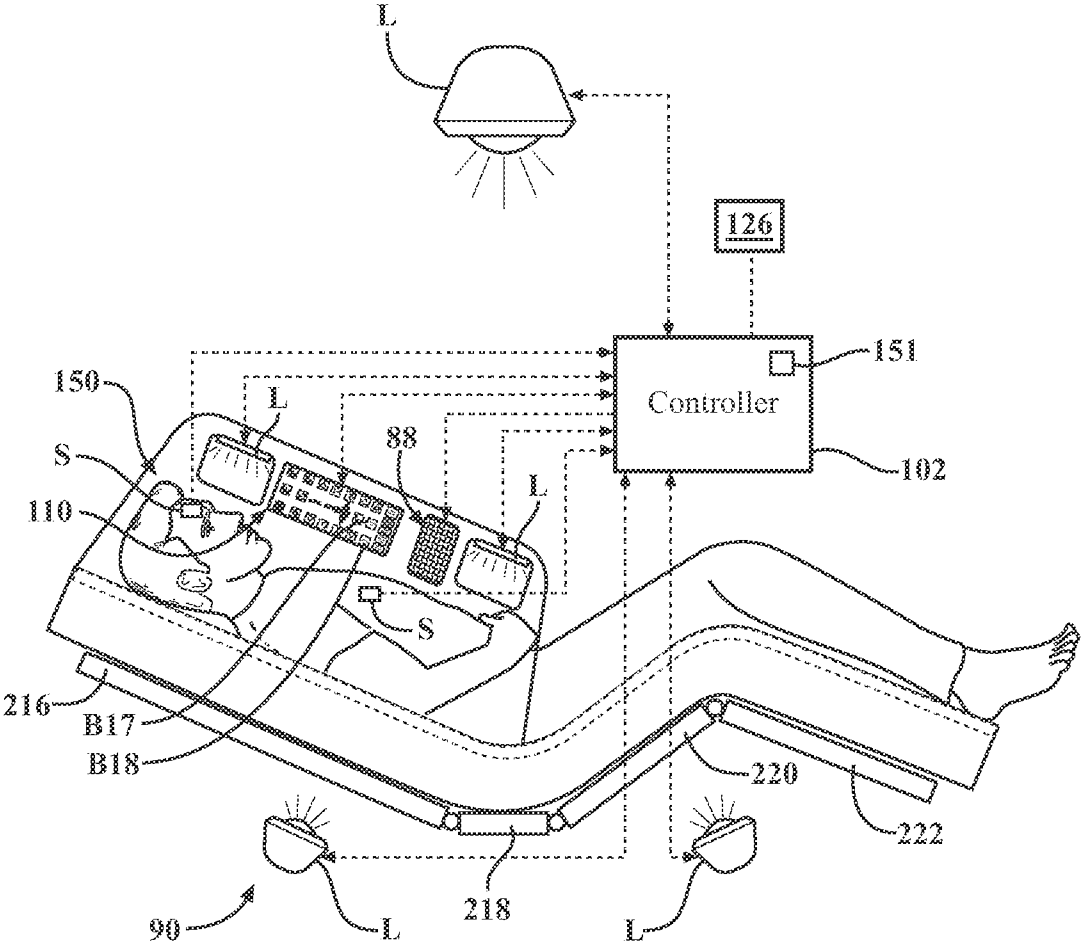
FIG. 21 is an illustration of an entertainment device and a lighting device.

An entertainment device 88 (e.g., television, radio, etc.) may be activated or adjusted for patient comfort or therapeutic purposes. The entertainment device 88 may be activated or adjusted to provide soothing entertainment or background noise to the patient. In some embodiments the entertainment device 88 comprises at least one piece of entertainment equipment. In FIG. 21, the entertainment device 88 is shown as a music player for playing various types of music.

The sensing system 150 is configured to provide the patient condition input signal to the controller 102 that comprises data relating to one or more of the patient's temperature, the patient's heart rate, the patient's respiration rate, or other physiological parameters of the patient that indicate whether or not the patient is in a desired patient condition, e.g., a relaxed condition. The controller 102 then determines the current patient condition based on the sensed data and compares the current patient condition to the desired patient condition. If the controller 102 determines that the current patient condition (e.g., current heart rate) is not the same as the desired patient condition (e.g., relaxed heart rate) the controller 102 may activate the entertainment device 88. There may be a desire to place the patient in a relaxed condition, as it may be ideal for recovering from injury, illness, or a surgical procedure.

In one exemplary operation of the entertainment device 88, the first input signal is provided by the caregiver via button B17 (see also FIG. 3). When the button B17 is actuated, the controller 102 begins to monitor the patient via the sensing system 150 to determine if the patient is in the relaxed condition. The entertainment device 88 may be automatically activated by depressing button B17 or may be simply placed on standby to be ready to activate in the event the controller 102 determines that the patient is not in the relaxed condition. When the patient condition input signal indicates that the patient is not in the relaxed condition, the controller 102 activates the entertainment device 88 or continues operating the entertainment device 88 in order to relax the patient. In this example, the entertainment device 88 may be configured to play soothing background music to calm the patient when activated by the controller 102. The entertainment device 88 will continue to be activated until the patient reaches the relaxed condition. Once the relaxed condition is reached, the entertainment device 88 may be deactivated or turned off. In this example, the current patient condition can continue to be sensed by the sensing system 150 such that if the current patient condition returns to a condition other than the relaxed condition, the entertainment device 88 may then be reactivated for a predetermined period of time. Alternatively, if the patient is reacting negatively to activation of the entertainment device 88, e.g., the patient is becoming more tense than before as measured by the patient's heart rate or other physiological parameter, then the entertainment device 88 may be automatically deactivated or adjusted, such as by changing the output or content provided by the entertainment device 88, e.g., changing the television channel, radio station, type of music, the volume, etc.

The lighting device 90 may comprise one or more light sources L and a dimmer apparatus 151 connected to the light sources L to provide lighting that makes the patient more comfortable, as shown in FIG. 21. In some embodiments one or more of the light sources L may be adjusted to be on, off, dimmed or brightened to provide soothing lighting to the patient. In other embodiments, active cancelling of noise may also be employed to make the patient more comfortable.

The sensing system 150 is configured to provide the patient condition input signal to the controller 102 that comprises data relating to one or more of the patient's temperature, the patient's heart rate, the patient's respiration rate, or other physiological parameters of the patient that indicate whether or not the patient is in a desired patient condition, e.g., the relaxed condition. The controller 102 then determines the current patient condition based on the sensed data and compares the current patient condition to the desired patient condition. If the controller 102 determines that the current patient condition (e.g., current heart rate) is not the same as the desired patient condition (e.g., relaxed heart rate) the controller 102 may activate the lighting device 90 to dim the light sources L or brighten the light source L via the dimmer apparatus 151.

In one exemplary operation of the lighting device 90, the first input signal is provided by the caregiver via button B18 (see also FIG. 3). When the button B18 is actuated, the controller 102 begins to monitor the patient via the sensing system 150 to determine if the patient is in the relaxed condition. In some cases, when the button B18 is actuated, the lighting device 90 is automatically activated to turn on all the light sources L. In some cases, the light sources L are controlled to their brightest setting, and in some cases, the light sources L are controlled to their dimmest setting. After being activated, the controller 102 continues to monitor the current patient condition. When the current patient condition indicates that the patient is not in the relaxed condition, the controller 102 may automatically activate the dimmer apparatus to dim the light sources L in order to relax the patient. The light sources L may be dimmed until the controller 102 determines that the patient is in the relaxed condition. In this example, the current patient condition can continue to be sensed by the sensing system 150 such that if the current patient condition returns to a condition other than the relaxed condition, the dimmer apparatus 151 of the lighting device 90 may then be operated to further adjust the light sources L as needed. The controller 102, in some cases, may also control the dimmer apparatus 151 to brighten the light sources L if needed to place the patient in the relaxed condition.

In some embodiments, when the button B18 is actuated, the lighting device 90 assumes control of the light sources L and dims and brightens the light sources L as needed to keep the patient in the relaxed condition. For instance, when the patient is ready for sleep, the sensing system 150 may detect an elevated heart rate if the light sources L are too bright for the patient and will automatically dim the light sources L accordingly. Similarly, when the patient awakes after a long sleep, if the light sources L are too dim to see properly, the patient's heart rate may again elevate, and the controller 102 can then brighten the light sources L. The controller 102 can determine whether to dim or brighten the light sources L based on the current patient condition. If the current patient condition gets worse as the light sources L are dimmed over a predetermined period of time, then the controller 102 will recognize that the light sources L need to be brightened, and vice versa.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support system comprising:

a support structure including a base arranged for movement along floor surfaces, an intermediate frame spaced above the base, and a patient support deck coupled to the intermediate frame;

a mattress disposed on the patient support deck comprising a secondary support surface for supporting a patient, the mattress extending between a head end and a foot end and including one or more cushions, a patient raising device including plurality of patient raising inflation bladders each shaped for inflation vertically, and a cover enclosing the one or more cushions and the patient raising device therein;

a control unit including a motor coupled to a pump disposed in fluid communication with the patient raising device;

a user input device configured to provide an input signal; and a controller disposed in communication with the control unit and the user input device, the controller being configured to:

select operation of the patient raising device based on the input signal, and operate the motor of the control unit to direct air with the pump to the patient raising device and control inflation and deflation vertically of the plurality of patient raising inflation bladders to create a wave force to vertically raise and lower the secondary support surface of the mattress for pushing the patient towards the head end to raise the patient from a slouched position to a raised position.

2. The patient support system of claim 1, wherein the plurality of patient raising inflation bladders are spaced longitudinally from each other between the head end and the foot end of the mattress.

3. The patient support system of claim 2, wherein the one or more cushions includes a base cushion supporting the plurality of patient raising inflation bladders.

4. The patient support system of claim 3, wherein the one or more cushions further includes a pair of outside cushions extending longitudinally between the head end and the foot end of the mattress, with the plurality of patient raising inflation bladders spaced laterally between the pair of outside cushions.

5. The patient support system of claim 1, wherein the mattress further includes a patient centering device including a pair of elongate bladders supported within the cover spaced laterally from each other and extending longitudinally between the head end and the foot end of the mattress;

wherein the pump of the control unit is disposed in fluid communication with the pair of elongate bladders; and wherein the controller is further configured to select operation of the patient centering device based on the input signal, and operate the motor of the control unit to direct air with the pump to the patient centering device and control inflation of the pair of elongate bladders to move the patient towards a centered position along a longitudinal centerline of the mattress.

6. The patient support system of claim 5, wherein the plurality of patient raising inflation bladders are spaced vertically between the pair of elongate bladders and at least one of the one or more cushions.

7. The patient support system of claim 1, wherein the mattress further includes a patient ingress egress device including a main air bladder supported within the cover extending longitudinally between the head end and the foot end of the mattress;

wherein the pump of the control unit is disposed in fluid communication with the main air bladder; and wherein the controller is further configured to select operation of the patient ingress egress device based on the input signal, and operate the motor of the control unit to direct air with the pump to the patient ingress egress device and control inflation of the main air bladder to increase a firmness of the mattress to facilitate patient ingress and egress.

8. The patient support system of claim 7, wherein the plurality of patient raising inflation bladders are spaced vertically between the main air bladder and at least one of the one or more cushions.

9. The patient support system of claim 1, wherein the controller is further configured to sequentially inflate the plurality of patient raising inflation bladders to raise the patient from the slouched position to the raised position.

10. The patient support system of claim 1, wherein the controller is configured to fully inflate one of the plurality of patient raising inflation bladders at a time to create the wave force.

11. The patient support system of claim 1, wherein the controller is configured to simultaneously:

deflate an inflated one of the plurality of patient raising inflation bladders, and inflate another of the plurality of patient raising inflation bladders.

12. The patient support system of claim 1, wherein the cover is formed from a stretchable material to accommodate inflation of the plurality of patient raising inflation bladders to create the wave force within the mattress.

13. The patient support system of claim 12, wherein the cover is vapor permeable.

14. The patient support system of claim 1, wherein the plurality of patient raising inflation bladders includes a seat raising bladder located below a seat of the patient, and one or more lower body raising bladders located closer than the seat raising bladder to the foot end of the mattress; and wherein the controller is further configured to inflate the seat raising bladder before the one or more lower body raising bladders.

15. The patient support system of claim 14, wherein the one or more lower body raising bladders include a plurality of lower body raising bladders; and wherein the controller is further configured to sequentially inflate the plurality of lower body raising bladders.

16. The patient support system of claim 1, further comprising a plurality of valves interposed in fluid communication between the pump of the control unit and the plurality of patient raising inflation bladders of the patient raising device.

17. The patient support system of claim 16, wherein the controller is disposed in communication with the plurality of valves to control fluid communication between the plurality of patient raising inflation bladders and the pump.

18. The patient support system of claim 1, further comprising a sensing system configured to provide a system input signal indicative of a patient condition including a patient position; and wherein the controller is disposed in communication with the sensing system and is further configured to:

determine a current patient position based on the system input signal, compare the current patient position to the raised position, and operate the motor of the control unit to direct air with the pump to the patient raising device and control inflation of the plurality of patient raising inflation bladders to raise the patient from the current patient position to the raised position.

19. The patient support system of claim 1, further comprising a universal input device configured to provide a universal input signal;

wherein the user input device includes a voice activation interface configured to receive a voice activation command associated with the pump; and wherein the controller is further configured to assign a functionality to the universal input device based on the voice activation command such that, after assigning the functionality to the universal input device, the controller is configured to operate the pump while receiving the universal input signal from the universal input device.

* * * * *